United States Patent
Patchava et al.

(10) Patent No.: US 11,996,969 B2
(45) Date of Patent: May 28, 2024

(54) GUARD INTERVAL IN DELAY-DOPPLER DOMAIN

(71) Applicant: QUALCOMM Incorporated, San Diego, CA (US)

(72) Inventors: Raviteja Patchava, San Diego, CA (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/819,464

(22) Filed: Aug. 12, 2022

(65) Prior Publication Data

US 2024/0056344 A1    Feb. 15, 2024

(51) Int. Cl.
*H04L 27/26* (2006.01)
*H04L 5/00* (2006.01)
*H04W 72/04* (2023.01)

(52) U.S. Cl.
CPC ...... *H04L 27/2666* (2013.01); *H04L 27/2607* (2013.01); *H04W 72/04* (2013.01)

(58) Field of Classification Search
CPC ............. H04L 27/2634; H04L 27/2636; H04L 27/2639; H04L 27/2697; H04L 5/0007; H04L 27/26025
See application file for complete search history.

(56) References Cited

FOREIGN PATENT DOCUMENTS

WO    WO-2023040621 A1 *  3/2023

OTHER PUBLICATIONS

Berardinelli G., et al., "Zero-Tail DFT-Spread-OFDM Signals", Globecom 2013 Workshop—Broadband Wireless Access, IEEE, Dec. 9, 2013, XP032600025, IEEE Global Telecommunications Conference Workshops, pp. 229-234, DOI: 10.1109/GLOCOMW.2013.6824991.
Hadani R., et al., "Orthogonal Time Frequency Space Modulation", IEEE WCNC, arXiv: 1808.00519v1 [cs.IT], Aug. 1, 2018, pp. 1-13.
Raviteja P., et al., "Practical Pulse-Shaping Waveforms for Reduced-Cyclic-Prefix OTFS," IEEE Transaction on Vehicular Technology, vol. 68, No. 1, pp. 957-961, Jan. 2019.
Sahin A., et al., "An Improved Unique Word DFT-Spread OFDM Scheme for 5G Systems", 2015 IEEE Globecom Workshops (GC Wkshps), Dec. 2015, 6 pages.

* cited by examiner

*Primary Examiner* — Melvin C Marcelo
*Assistant Examiner* — Natali Pascual Peguero
(74) *Attorney, Agent, or Firm* — Patterson & Sheridan LLP

(57) ABSTRACT

Certain aspects of the present disclosure provide techniques for using a guard interval in a delay-Doppler domain. A method of wireless communication includes converting information in a delay-Doppler domain to a time-frequency domain, wherein the information includes data and at least one guard interval (GI); mapping the converted information to time and frequency resources of an orthogonal frequency domain multiplexing (OFDM) resource grid in the time-frequency domain; generating a time-domain waveform based on the OFDM resource grid, wherein the time-domain waveform includes one or more GIs; and outputting the time-domain waveform for transmission to a node.

30 Claims, 15 Drawing Sheets

GUARD INTERVAL IN DELAY-DOPPLER DOMAIN

BACKGROUND

Field of the Disclosure

Aspects of the present disclosure relate to wireless communications, and more particularly, to techniques for delay-Doppler processing.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communication at a first node. The method includes converting information in a delay-Doppler domain to a time-frequency domain, wherein the information includes data and at least one guard interval (GI); mapping the converted information to time and frequency resources of an orthogonal frequency domain multiplexing (OFDM) resource grid in the time-frequency domain; generating a time-domain waveform based on the OFDM resource grid, wherein the time-domain waveform includes one or more GIs; and outputting the time-domain waveform for transmission to a second node.

Another aspect provides a method of wireless communication at a first node. The method includes obtaining a time-domain waveform that includes one or more GIs, from a second node; converting the time-domain waveform to a frequency domain; identifying time and frequency resources associated with information in an OFDM resource grid in a time-frequency domain; and converting the time and frequency resources to information in a delay-Doppler domain, the information including data and at least one GI.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
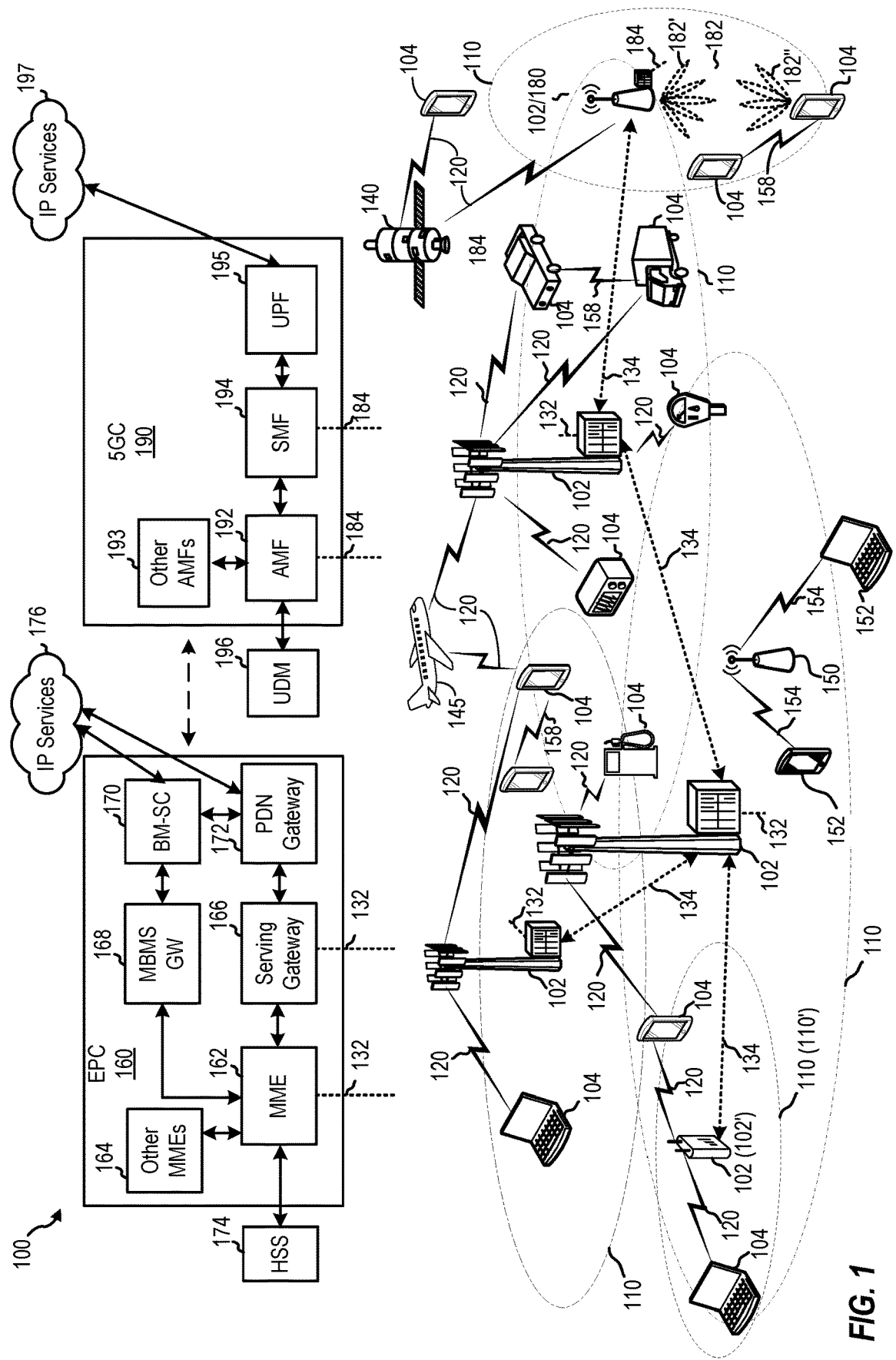
FIG. 1 depicts an example wireless communications network.

Aspects of the present disclosure provide apparatuses, methods, processing systems, and computer-readable mediums for using a guard interval in a delay-Doppler domain.

In a wireless communication network, some wireless devices (e.g., user equipment) may experience greater frequency shifts and/or a greater spread of frequency shifts due to the Doppler effect than other wireless devices. For example, wireless devices on a high speed train (HST) may encounter greater frequency shifts compared to other wireless devices, such as lower mobility or static (stationary or immobile) devices, in the same cell coverage. In cases where multiple transmit-receive points (TRPs) provide wireless coverage, the wireless devices on a HST may experience a wide spread of Doppler shifts, which may lead to inter-carrier interference (ICI) for the wireless devices. An orthogonal frequency-division multiplexing (OFDM) modulation scheme may be sensitive to Doppler effects, such as the frequency shifts and frequency spreads encountered by wireless devices in high mobility scenarios (e.g., HSTs or other high speed methods of transportation). In certain cases, the Doppler effects may degrade the performance of wireless communications using an OFDM modulation scheme, for example, due to the ICI from Doppler spreading.

Aspects of the present disclosure provide apparatus and techniques for using a guard interval in each OFDM symbol, for example, to facilitate enhanced channel tracking in scenarios where Doppler effects are encountered. The guard interval may be formed in the delay-Doppler domain associated with orthogonal time frequency space (OTFS) precoding. For example, the guard interval may be arranged in the head or tail of the delay domain of the OTFS precoding. In certain aspects, the guard interval may be formed using a certain sequence, such as zeroes, a Zadoff Chu sequence, a pseudorandom noise (PN) sequence, or a sequence derived from data in the payload of a symbol, as further described herein.

The apparatus and techniques for using a guard interval described herein may provide various advantages. For example, a guard interval in the delay-Doppler domain may allow a receiver to track variations in the channel (e.g., phase noise or delay spreads) between the receiver and transmitter due to Doppler effects, such as ICI. When arranged at the head or tail (start or end) of a symbol, the guard interval may suppress or eliminate data leakage between OFDM symbols, such as inter-symbol interference from a previous symbol. The guard interval may be used without changing an OFDM symbol duration allowing the guard interval to be adopted in OFDM systems, such as 5G NR systems. The guard interval may allow for the information associated with multiple users to multiplexed in an OFDM resource grid, such as the resource grid used in 5G NR systems.

As used herein, a high mobility wireless device may refer to a wireless communication device moving at a greater speed or velocity compared to another wireless device in a wireless communication network or cell. Similarly, a low mobility wireless device may refer to a wireless communication device moving at a lower speed or velocity compared to another wireless device in a wireless communication network or cell. As such, the terms high and low mobility may be relative to one another.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipment.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
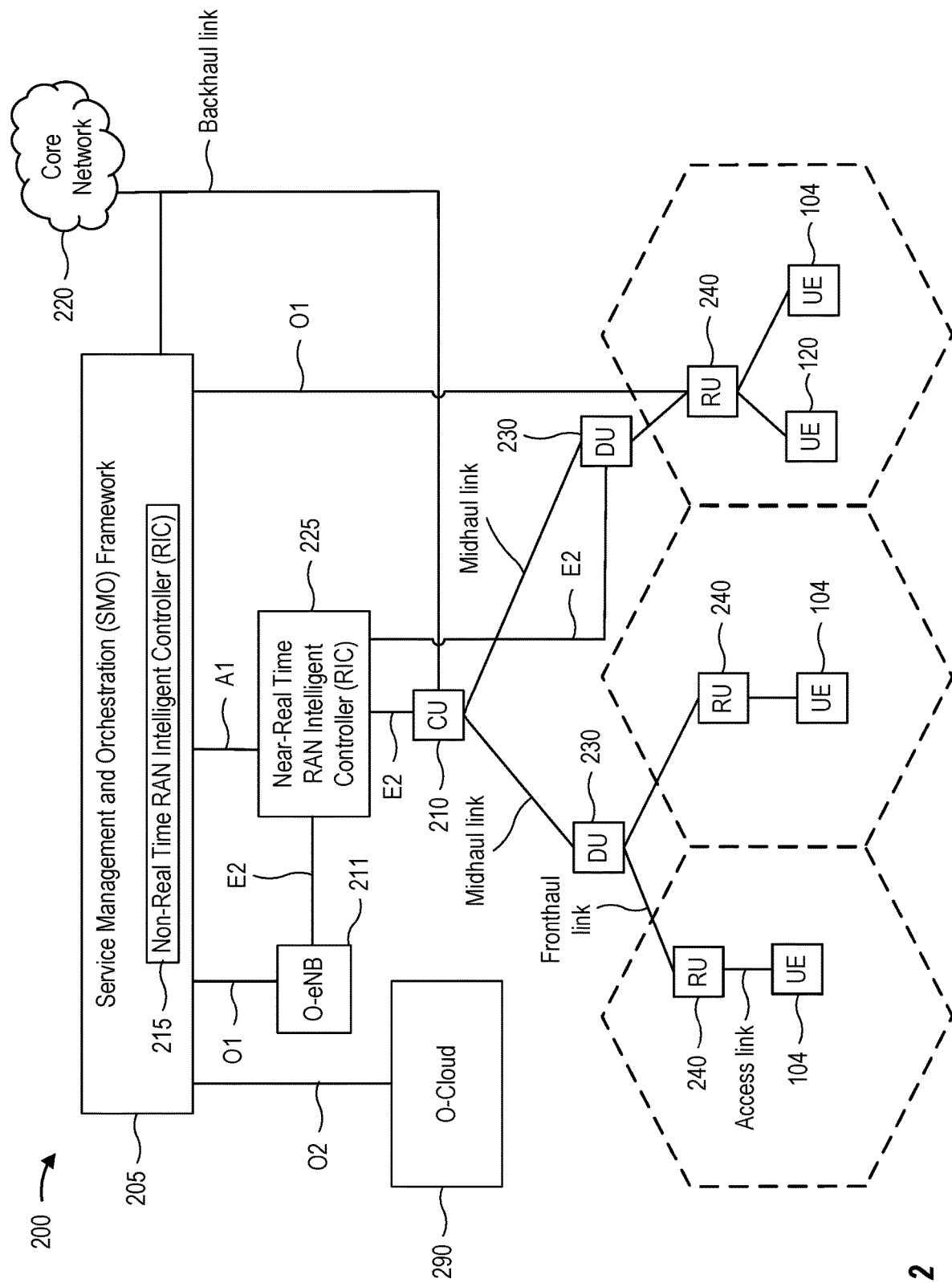
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an AI interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
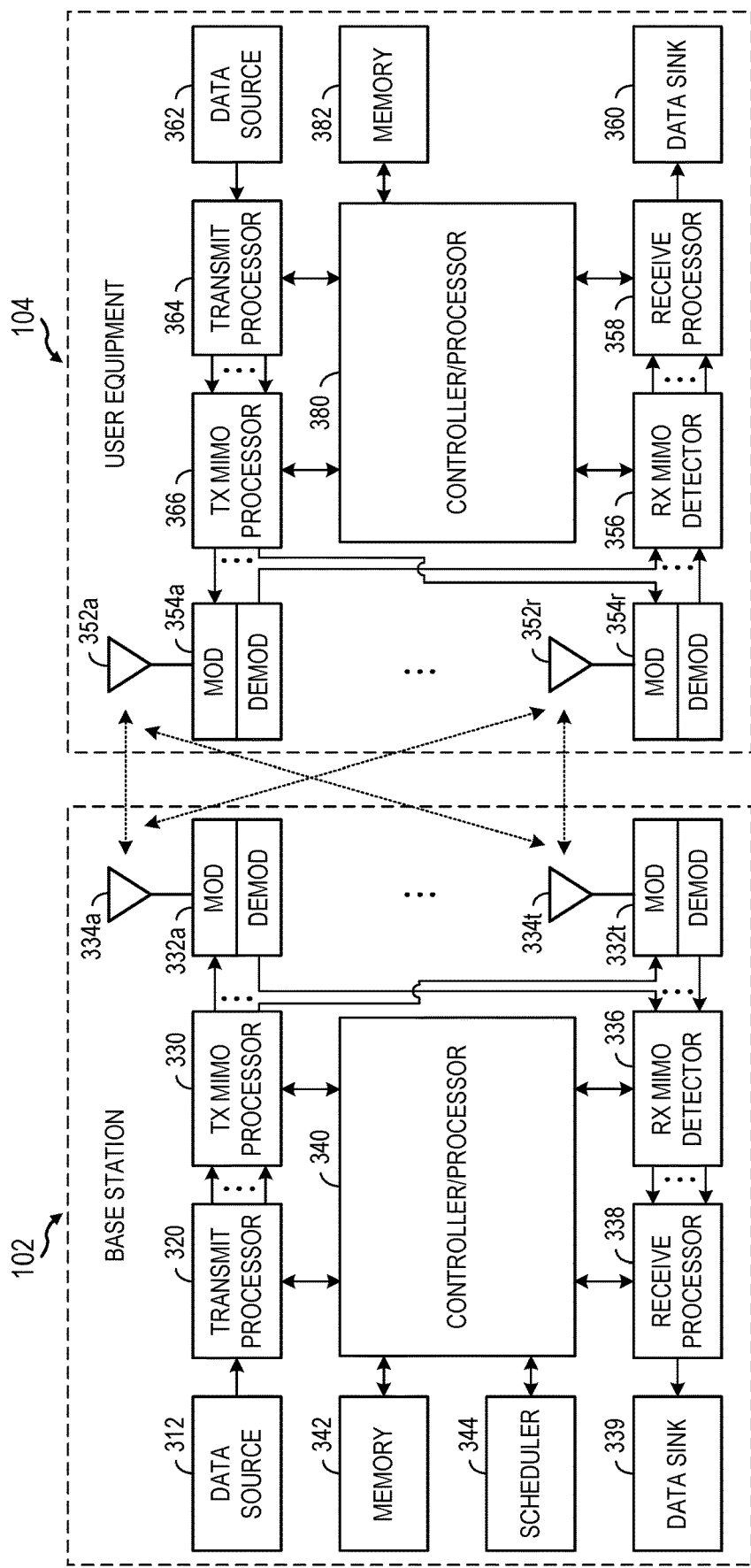
FIG. 3 depicts aspects of an example base station and an example user equipment.

FIG. 3 depicts aspects of an example BS 102 and a UE 104. Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
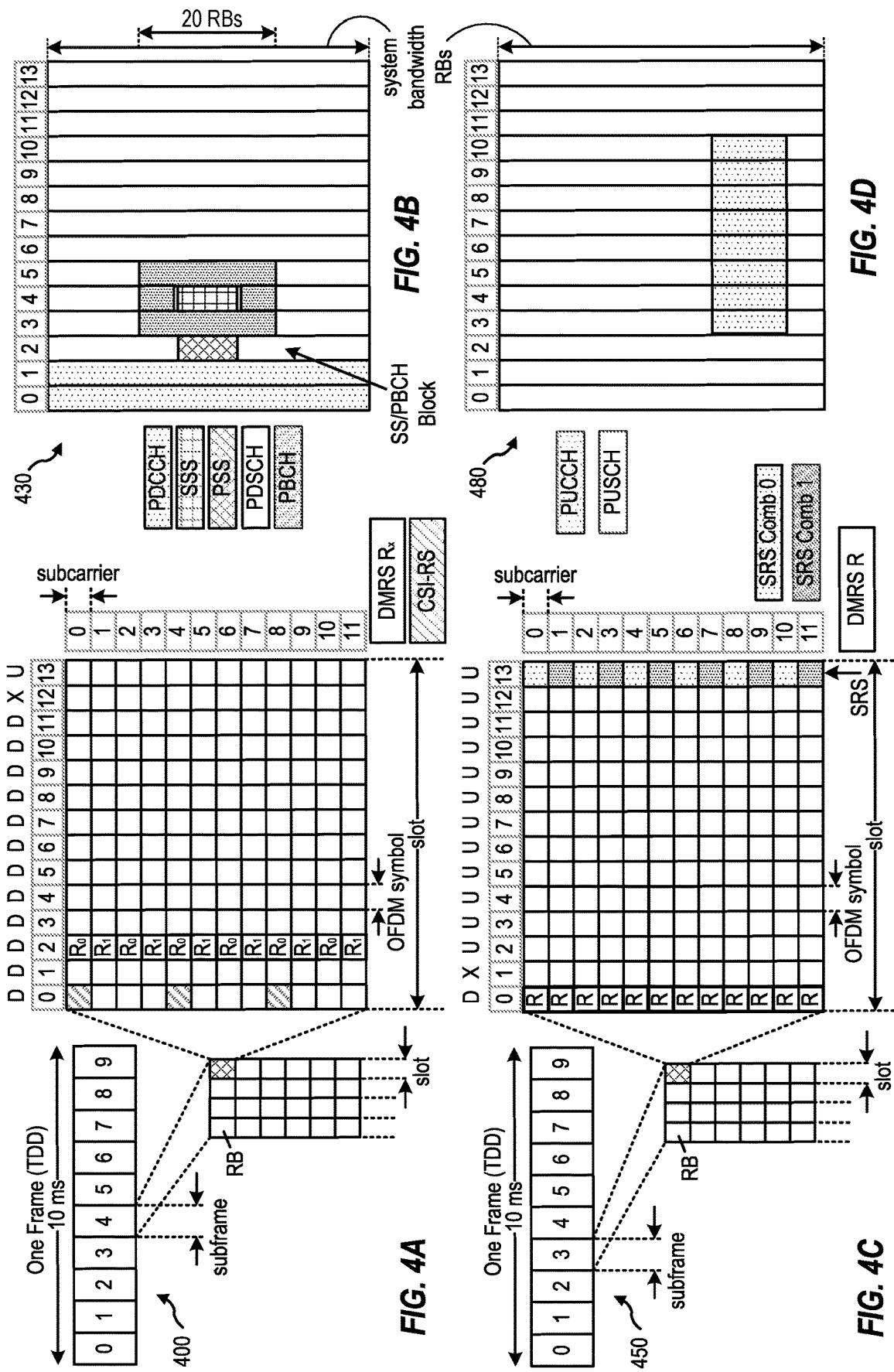
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology μ, there are 14 symbols per slot and 2μ slots per subframe. The subcarrier spacing and symbol length (duration) are a function of the numerology. The subcarrier spacing may be equal to $2^\mu \times 15$ kHz, where μ is the numerology 0 to 6. As such, the numerology μ=0 has a subcarrier spacing of 15 kHz and the numerology μ=6 has a subcarrier spacing of 960 kHz. The symbol length (duration) is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

In a wireless communication network, some wireless devices (e.g., user equipment) may experience greater frequency shifts and/or a greater spread of frequency shifts due to the Doppler effect than other wireless devices. For example, wireless devices on a HST) (or other high mobility vehicles, such as an unmanned aerial vehicle (UAV)) may encounter greater frequency shifts compared to other wireless devices, such as lower mobility or static (stationary or immobile) devices, in the same cell coverage. In cases where multiple transmit-receive points (TRPs) provide wireless coverage, the wireless devices on a HST may experience a wide spread of Doppler shifts, which may lead to inter-carrier interference (ICI) for the wireless devices. An orthogonal frequency-division multiplexing (OFDM) modulation scheme may be sensitive to Doppler effects, such as the frequency shifts and frequency spreads encountered by wireless devices in high mobility scenarios (e.g., HSTs or other high speed methods of transportation or vehicles). In certain cases, the Doppler effects may degrade the performance of wireless communications using an OFDM modulation scheme, for example, due to ICI from Doppler spreading.

To alleviate the ICI from Doppler spreading, a transmitter can apply an orthogonal time frequency space (OTFS) precoder to a transmission. The OTFS precoder can multiplex information in a delay-Doppler domain allowing for a channel estimation that accounts for inter-carrier interference due to Doppler effects.

Figure 5:
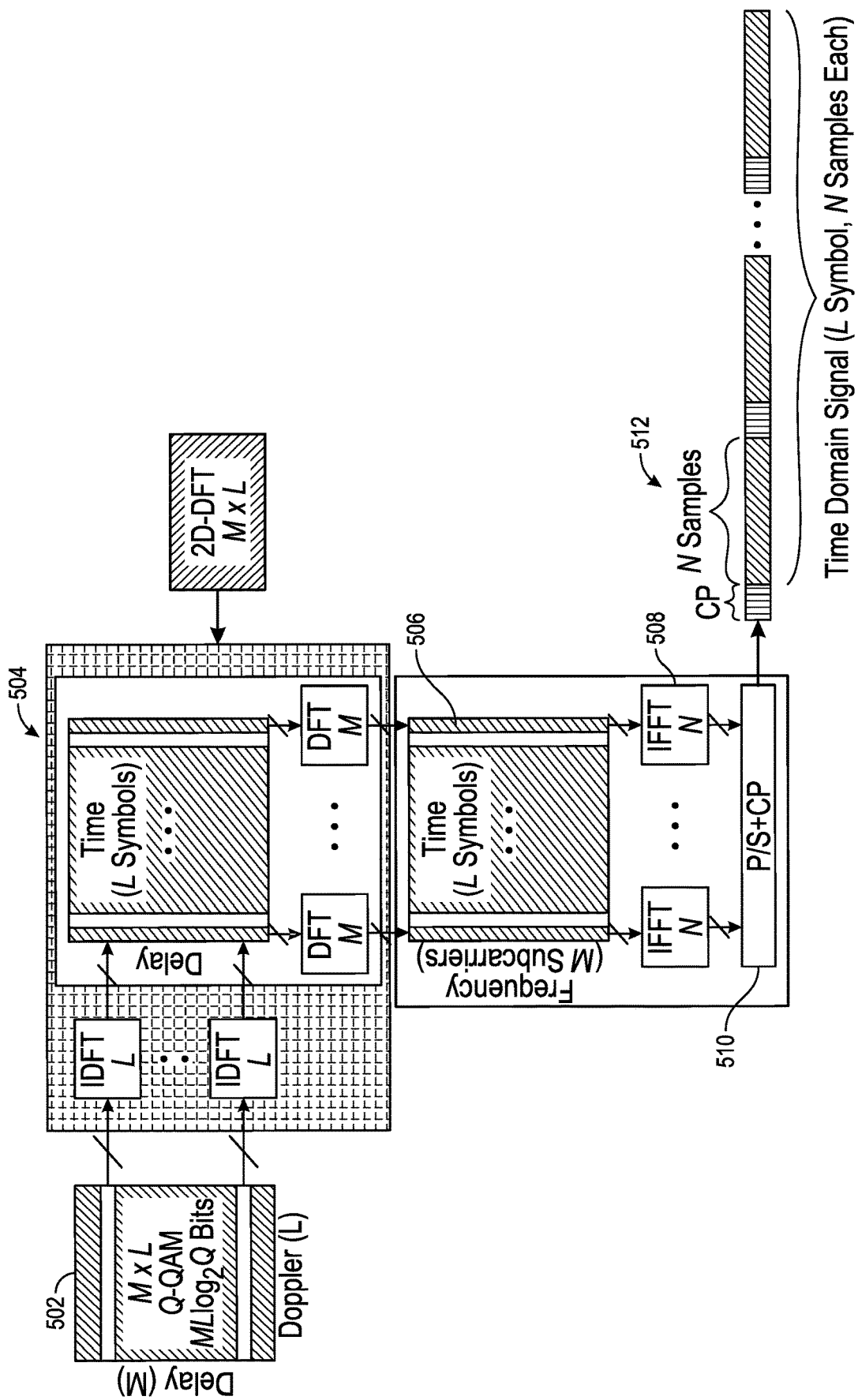
FIG. 5 is a diagram illustrating an example of orthogonal time frequency space (OTFS) processing at a transmitter.

FIG. 5 is a diagram illustrating an example of orthogonal time frequency space (OTFS) processing at a transmitter. In this example, information 502 may be representative of information (e.g., quadrature amplitude modulation (QAM) bits) modulated in a delay-Doppler domain, for example, using an OTFS modulation. The information 502 may have M×L information symbols. At activity 504, the delay-Doppler information 502 may be converted to a time-frequency domain using a two-dimensional discrete Fourier transform (2D-DFT), which may be a combination of an inverse discrete Fourier transform (IDFT) and a DFT as depicted. The value of L may depend on the geometric coherence time and/or latency (e.g., the smallest of the geometric coherence and the latency), where the geometric coherence time is the time duration during which the scatters and the Doppler remain constant. The value of L may depend on the velocity and/or spatial parameters (e.g., angle of arrival and/or angle of departure). For example, L may be selected as 14 in the case of a slot-based OTFS transmission. In certain cases, the delay-Doppler information 502 may be converted to the time-frequency domain using an OTFS precoder to (e.g., an inverse symplectic finite Fourier transform (ISFFT)). The converted information 506 may be multiplexed into an OFDM resource grid, such as the resource grid described herein with respect to FIGS. 4A-4D. At activity 508, the converted information 506 may be converted from the time-frequency domain to the time-domain, for example using an inverse fast Fourier transform (IFFT). At activity 510, the parallel time-domain output from the IFFT may be serialized, and a cyclic prefix (CP) may be added to each symbol, such that a time-domain waveform 512 may be formed for transmission. In some cases, a single CP may be used for a set of L symbols. For example, only one CP may be added to a symbol per L symbols. In such cases, the single CP-based OTFS waveform may be used for cases where there is no multi-user data multiplexed in the frequency domain.

Figure 6:
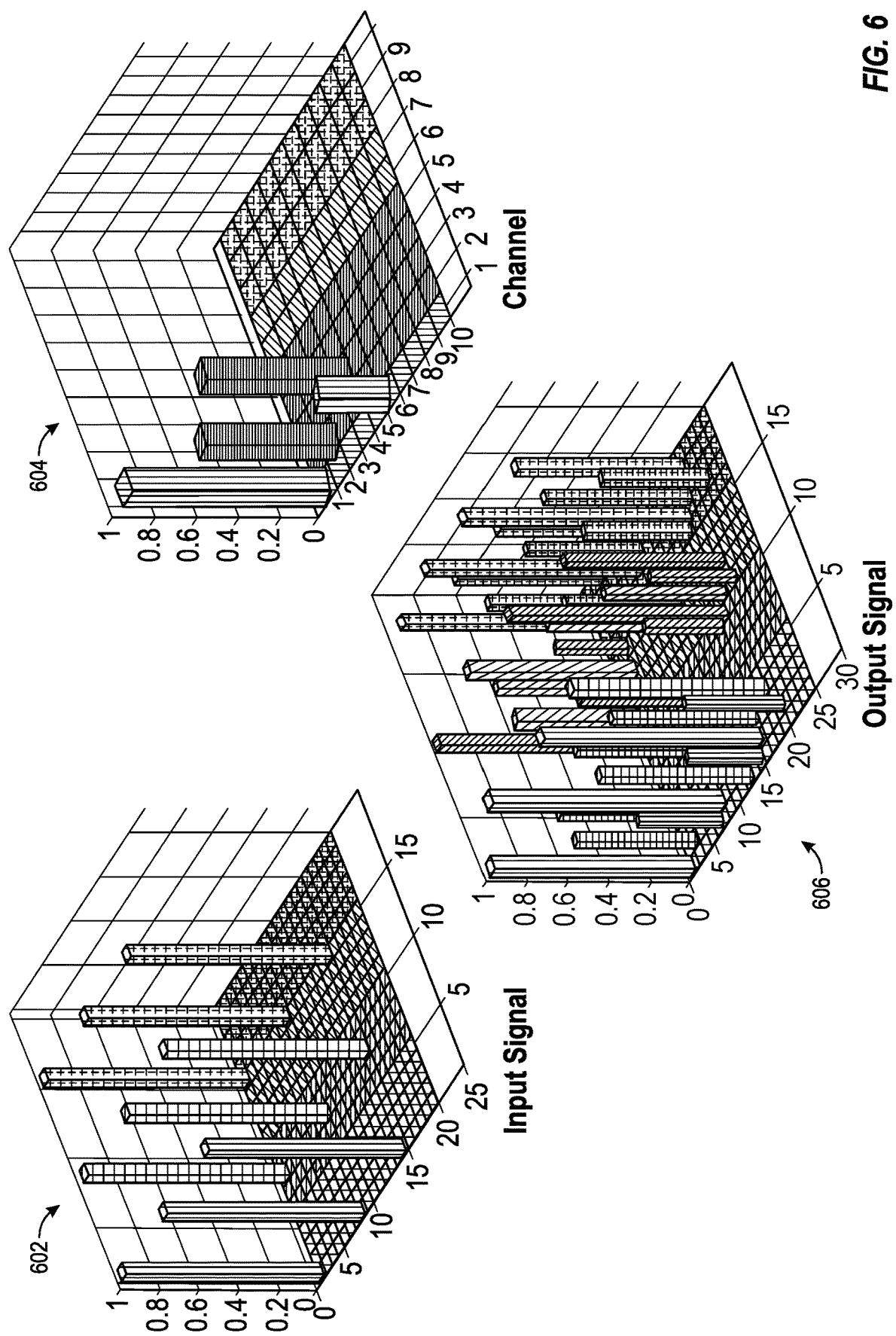
FIG. 6 is a diagram illustrating an example of channel estimation in a delay-Doppler domain.

FIG. 6 is a diagram illustrating an example of channel estimation in a delay-Doppler domain. In this example, an input signal 602, channel 604, and output signal 606 are depicted in a delay-Doppler domain. An OTFS input-output relationship in the case of delay-Doppler channel can be represented as two-dimensional twisted convolution with varying phase shifts. For example, the output signal 606 may be determined according to the following expression:

$$y[m, l] = \sum_{m_\tau} \sum_{l_v} h[m_\tau, l_v] e^{\frac{j2\pi(m-m_\tau)l_v}{ML}} x[m-m_\tau, l-l_v]$$

where y[m, l] is the output signal (e.g., the received signal) in the delay-Doppler domain; $h[m_\tau, l_v]$ is the channel matrix in the delay-Doppler domain; $x[m-m_\tau, l-l_v]$ is the input signal (e.g., the transmitted signal) in the delay-Doppler domain; and $m_\tau$ and $l_v$ are the delay and Doppler taps, respectively. Due to the under-spread nature, the channel may occupy only a small fraction (around the origin) of the delay-Doppler as shown in FIG. 6.

Aspects Related to a Guard Interval in the Delay-Doppler Domain

Aspects of the present disclosure provide apparatus and techniques for using a guard interval in each OFDM symbol, for example, to facilitate enhanced channel tracking in Doppler scenarios. The guard interval may be formed in the delay-Doppler domain for OTFS precoding. The guard interval may be arranged in the head or tail of the delay domain of the OTFS precoding. The guard interval may be formed using a certain sequence, such as zeroes, a Zadoff Chu sequence, a pseudorandom noise (PN) sequence, or a sequence derived from data in the payload of a symbol, as further described herein.

The apparatus and techniques for using a guard interval described herein may provide various advantages. For example, a guard interval in the delay-Doppler domain may allow a receiver to track variations in the channel (e.g., phase noise or delay spreads) between the receiver and transmitter due to Doppler effects, such as ICI. When arranged at the head or tail (start or end) of a symbol, the guard interval may suppress or eliminate data leakage between OFDM symbols, such as inter-symbol interference from a previous symbol. The guard interval may be used without changing an OFDM symbol duration allowing the guard interval to be adopted in OFDM systems, such as 5G NR systems. The guard interval may allow for the information associated with multiple users to be multiplexed in an OFDM resource grid, such as the resource grid used in 5G NR systems.

Figure 7:
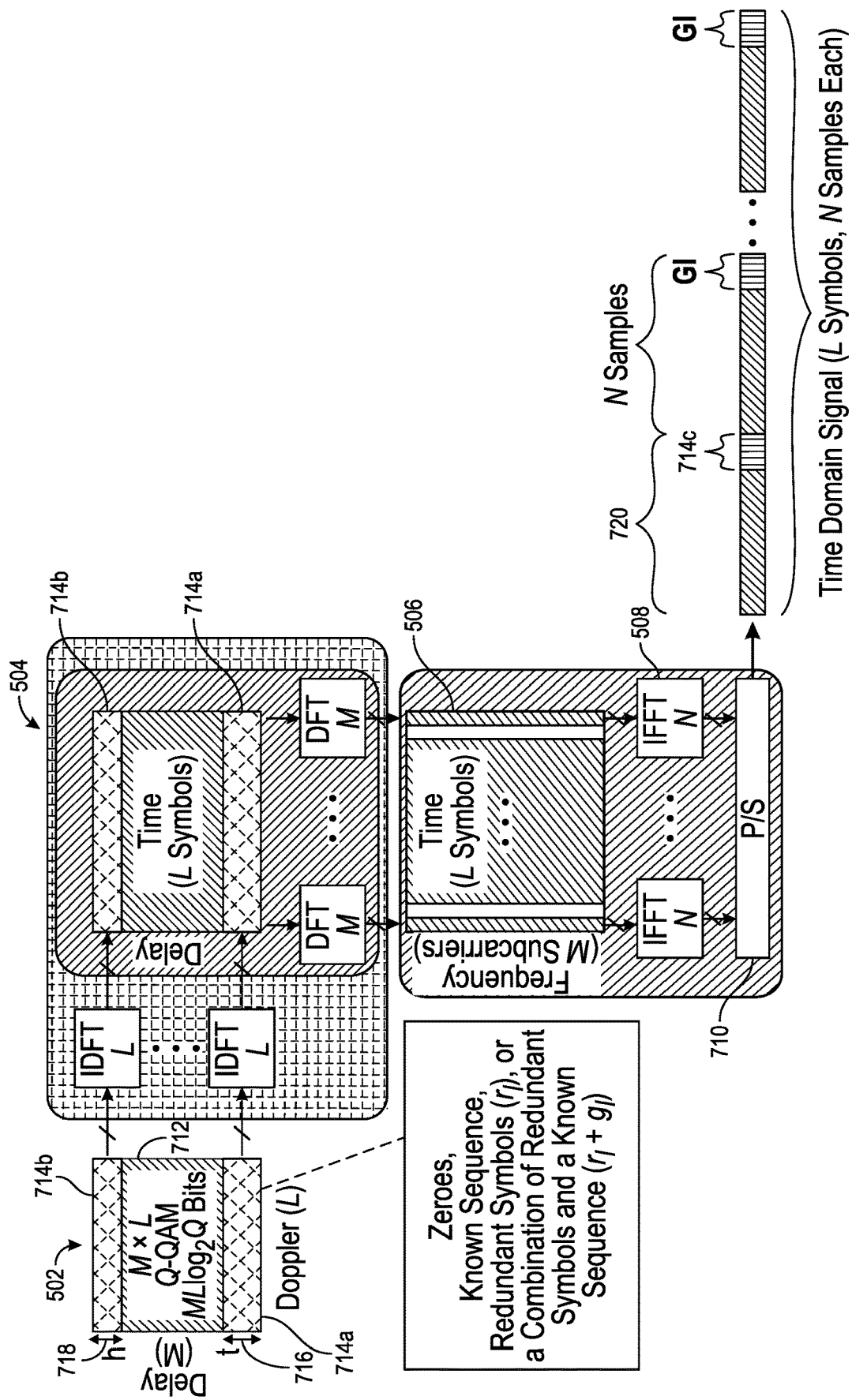
FIG. 7 is a diagram illustrating an example of OTFS processing with a guard interval in the delay-Doppler domain at a transmitter.

FIG. 7 is a diagram illustrating an example of OTFS processing with a guard interval in the delay-Doppler domain at a transmitter. In this example, the OTFS processing operations may follow the operations as described herein with respect to FIG. 5, except as indicated otherwise.

The information 502 may include data 712 and at least one guard interval 714a, 714b (collectively 714). The data 712 may include user data and/or control data. The user data may include information specific to a user, such as user application information including social media traffic, voice data, video data, etc. The control data may include network administrative traffic, such as downlink control information (DCI), radio resource control (RRC) information, medium access control (MAC) information, and/or system information.

A first guard interval 714a may be arranged in the information 502 at the tail 716 of the delay domain, where the tail 716 is representative of a last (end) portion of the information in the delay domain. The first guard interval may have a length of h row(s) in the delay domain. In some cases, a second guard interval 714b may be arranged in the information 502 at the head 718 of the delay domain, where the head 718 is representative of a first (initial or start) portion of the information in the delay domain. The head 718 is arranged opposite to the tail 716 in the delay domain. The second guard interval may have a length of t row(s) in the delay domain. The second guard interval 714b at the head (h) may be used to ensure a smooth transition at the edges in the time domain. In certain cases, a single guard interval may be arranged in the information at the tail or head.

The guard interval 714 may include a sequence of information, which may be different from the data 712. In certain aspects, the guard interval 714 may include a sequence of one or more default values (e.g., zeroes). Zero rows may be inserted in the tail and/or head of the delay domain resources. Zeroes may be introduced in the first h row(s) and the last t row(s) of the delay-Doppler domain, corresponding to a total of (h+t)×L zeros out of L×M resources in the delay-Doppler domain. Due to the IDFT transform across the Doppler domain, the first guard interval 714a and the second guard interval 714b exist in the delay-time domain, which generate a low power signal at the tail part of a symbol in the time domain signal, as further described herein.

The length of a guard interval may be determined based on a Doppler characteristic encountered at the receiver and/or transmitter, the bandwidth, and the up-sampling ratio (M/N). The Doppler characteristic may include Doppler shift, Doppler spread, average delay, delay spread, or any combination thereof. For example, the length of a guard interval (in terms of the number of rows in the delay domain) may be determined according to the following expression:

$$l = \text{ceil}\left((\text{delay spread} * BW) * \frac{M}{N}\right) \quad (1)$$

where l is the number of rows (e.g., h or t) associated with the guard interval in the delay domain; delay spread is the delay spread encountered at the transmitter and/or receiver; BW is the channel bandwidth associated with the transmission; M/N is the up-sampling ratio applied to the information; and cell is a ceiling function that returns the least integer greater than or equal to x, where $$x = (\text{delay spread} * BW) * \frac{M}{N}.$$

At activity 710, the parallel time-domain output from the IFFT may be serialized into a time domain signal of symbols 720 without adding a cyclic prefix to each of the symbols. Each of the symbols 720 includes a third guard interval 714c in the time domain, due to the insertion of the guard interval 714a, 714b in the delay-Doppler domain. The third guard interval 714c may correspond to the first guard interval 714a, such that the third guard interval 714c may be arranged in a tail portion of the symbol 720. In some cases, there may be a fourth guard interval (not shown) arranged in the head portion of the symbol 720 and corresponding to the second guard interval 714b.

In certain aspects, the guard interval 714 may include a known (pre-determined or standardized) sequence. For example, the sequence may include a Zadoff-Chu sequence, a pseudorandom noise (PN) sequence, or a combination thereof. In the case of oversampling, the data portion may interfere into the guard interval portion of the time domain tail sequence.

To reduce the interference from the data into the guard interval, the guard interval 714 may include a non-zero redundant symbols (e.g., redundant information) derived from the data 712. The redundant symbols may not be a duplicate of the data 712 similar to a cyclic prefix. The redundant symbols may be determined based on the data, where the data may serve as a seed for generating a random sequence. For example, the redundant symbols may be selected in such a way that the interference of data into the tail part may be close to zero. At the receiver, the redundant symbols may be used to identify the data and/or channel variation due to Doppler effects to improve the performance.

Assuming $d_l$ and $r_l$ denote the data and redundant part of the $l^{th}$ symbol in the delay-Doppler domain, respectively, and $r_l$ includes the head and tail part of the redundant symbols (e.g., the first guard interval 714a and the second guard interval 714b), the time domain sequence, $x=[x_1 \ x_2 \ \ldots \ x_L]$, may be determined according to the following expression:

$$[x_1 \ x_2 \ \ldots \ x_L] = F_N^H B F_M P \begin{bmatrix} d_1 & d_2 & \cdots & d_L \\ r_1 & r_2 & \cdots & r_L \end{bmatrix} \quad (2)$$

$$F_L^H = \begin{bmatrix} A_{11} & A_{12} \\ A_{21} & A_{22} \end{bmatrix} \begin{bmatrix} d_1 & d_2 & \cdots & d_L \\ r_1 & r_2 & \cdots & r_L \end{bmatrix} F_L^H = \begin{bmatrix} x_{non-tail} \\ x_{tail} \end{bmatrix}$$

where P is the permutation matrix that splits the redundant symbols into head and tail part; $F_M$ is the DFT matrix in the delay domain; $F_L^H$ is the IDFT matrix in Doppler domain, B is the subcarrier mapping; $F_N^H$ is the IFFT to convert from frequency to time domain; and $A=F_N^H B F_M P$. To suppress the data leakage (interference) into the guard interval ($x_{tail}$ to be zero), the redundant symbols may be determined according to the following expression:

$$A_{21}d_l + A_{22}r_l = 0,$$

$$r_l = A_{22}^{-1} A_{21} d_l \forall l=1, \ldots, L \quad (3)$$

In certain cases, a known signal may be added to the redundant symbols ($r_l$) in the delay-Doppler domain, for example, to ensure a non-zero signal at the tail part. The redundant symbols may be further determined according to the following expression:

$$r_l' = r_l + g_l \quad (4)$$

where $r_l'$ is the combination of redundant symbols and a known signal; $r_l$ are the redundant symbols, for example, as determined according to Expression (3); and $g_l$ is the known signal, which may include a Zadoff-Chu sequence or a PN sequence, for example. At the receiver, the known signal may be determined from the combination $r_l'$ and used to evaluate channel variations due to Doppler effects.

In certain aspects, the guard interval may be partitioned into multiple segments in the delay domain, for example, to allow for efficient processing of the guard interval. For example, the guard interval may include a portion of redundant symbols and another portion of the known signal. There may be a separate allocation for a known signal and redundant symbols in the delay-Doppler domain. The redundant symbols may serve as a buffer between the data and the known signal to suppress interference from the data into the known signal, and the known signal may be used to track channel variations due to Doppler effects.

Figure 8:
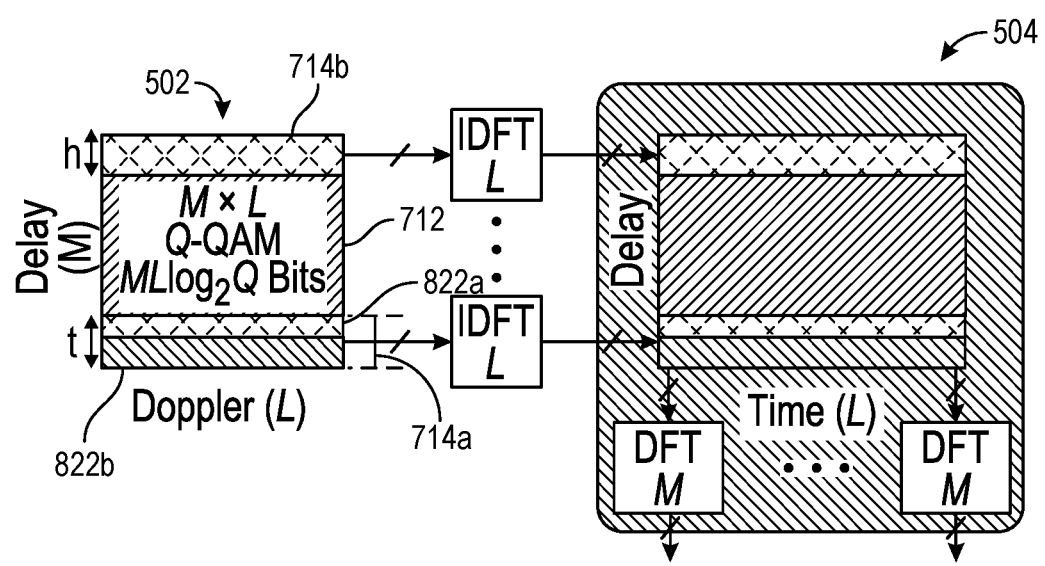
FIG. 8 is a diagram illustrating an example guard interval having multiple portions.

FIG. 8 is a diagram illustrating an example guard interval having multiple portions. In this example, the first guard interval 714a may include a first portion 822a and a second portion 822b. The first portion 822a may include the redundant symbols ($r_l$), and the second portion 822b may include a known signal ($g_l$), such as a Zadoff-Chu sequence or a PN sequence. The first portion 822a may be arranged between the data 712 and the second portion 822b in the delay domain. The first portion 822a may reduce the data 712 from interfering into the second portion 822b.

The number of resources in the delay-Doppler domain allocated to the first portion 822a and/or the second portion 822b may be determined based on certain criteria. For example, the length of the first portion 822a may be determined based on a modulation and coding scheme associated with the transmission, code rate associated with the transmission, and/or channel quality. The channel quality may include a channel quality indicator, a signal-to-noise ratio (SNR), a signal-to-interference plus noise ratio (SINR), a signal-to-noise plus distortion ratio (SNDR), a received signal strength indicator (RSSI), a reference signal received power (RSRP), a reference signal received quality (RSRQ), and/or a block error rate (BLER), for example.

Assuming $d_l$, $r_l$, and $g_l$ denote the data, redundant part, and known signal part of the $l^{th}$ symbol in the delay-Doppler domain, the time domain sequence, $x=[x_1\ x_2\ \ldots\ x_L]$, may be determined according to the following expression:

$$[x_1\ x_2\ \ldots\ X_L] = F_N^H B F_M P \begin{bmatrix} d_1 & d_2 & \ldots & d_L \\ r_1 & r_2 & \ldots & r_L \\ g_l & g_2 & \ldots & g_L \end{bmatrix} F_L^H \quad (5)$$

$$= \begin{bmatrix} A_{11} & A_{12} & A_{13} \\ A_{21} & A_{22} & A_{23} \end{bmatrix} \begin{bmatrix} d_1 & d_2 & \ldots & d_L \\ r_1 & r_2 & \ldots & r_L \\ g_1 & g_2 & \ldots & g_L \end{bmatrix} F_L^H = \begin{bmatrix} x_{non-tail} \\ x_{tail} \end{bmatrix}$$

To suppress the data leakage (interference) into the guard interval ($x_{tail}$ to be zero), the redundant symbols may be determined according to the Expression (4).

Figure 9:
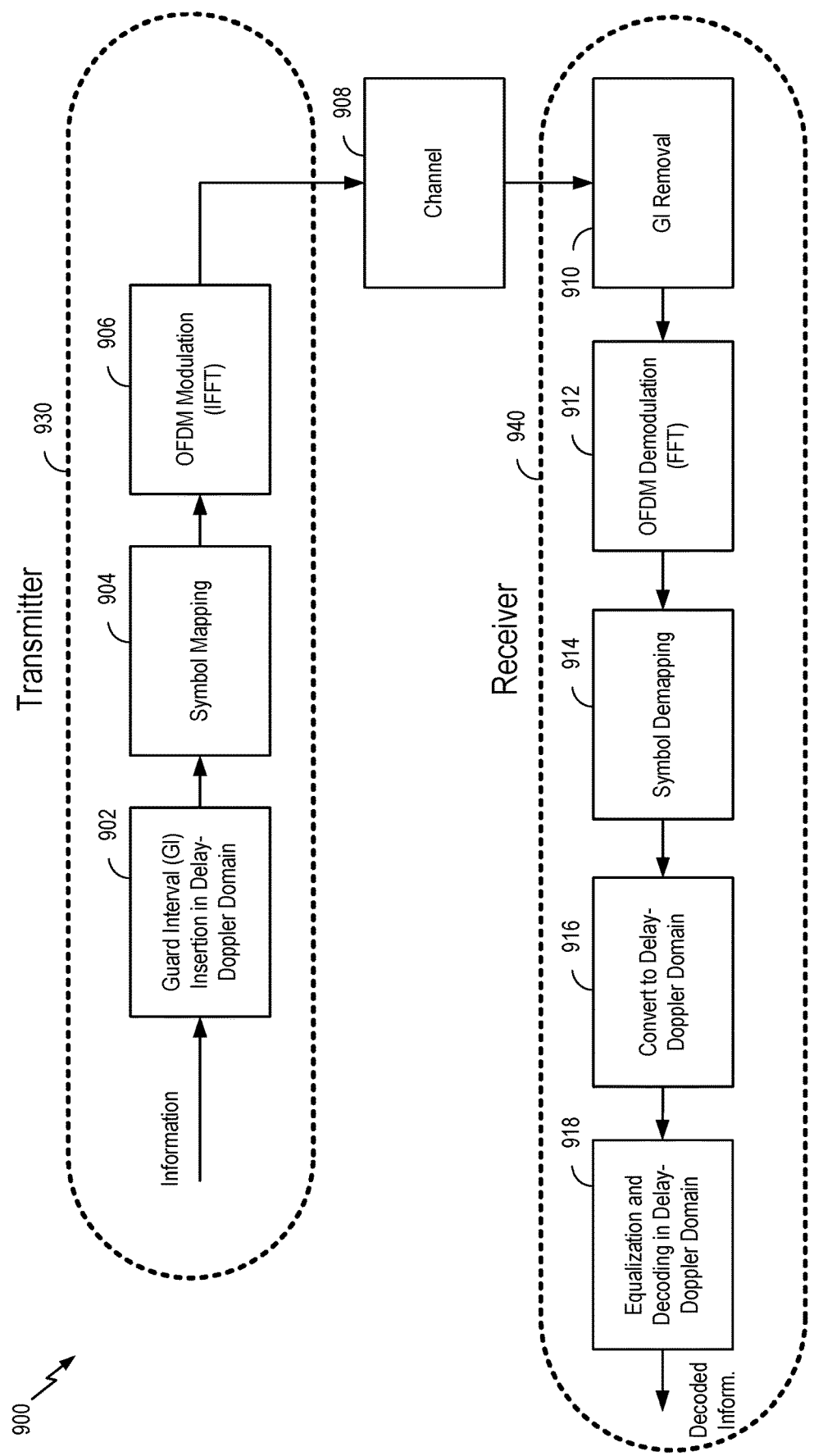
FIG. 9 is a diagram illustrating an example of an orthogonal frequency-division multiplexing (OFDM) processing flow at a transmitter and a receiver.

FIG. 9 is a diagram illustrating an example of an OFDM processing flow at a transmitter 930 (e.g., the BS 102) and a receiver 940 (e.g., the UE 104). In some cases, a user equipment (e.g., the UE 104) may be representative of the transmitter 930, and a base station (e.g., the BS 102) may be representative of the receiver 940. The OFDM processing flow may be implemented as software components that are executed and run on one or more processors (e.g., controller/processor 380 or 340 of FIG. 3) of the corresponding transmitter or receiver.

At block 902, the transmitter 930 may perform guard interval insertion in the delay-Doppler domain. The guard interval may be added to the information as described herein with respect to FIGS. 7 and 8. For example, the guard interval may be arranged in the tail of the information in the delay domain, where the guard interval includes a sequence of zeroes. In certain aspects, the guard interval may be determined to reduce inter-symbol interference due to Doppler effects, such as Doppler spreading or delay spread.

At block 904, the transmitter 930 may perform symbol mapping of the information in an OFDM resource grid, for example, as described herein with respect to FIGS. 4A, 4B, 4C, 4D, and 5.

At block 906, the transmitter 930 may perform OFDM modulation, for example, using an inverse fast Fourier transform (IFFT). For example, the transmitter 930 may apply the IFFT on the frequency components to generate a time-domain waveform.

At block 908, the transmitter 930 may transmit the time-domain waveform with the guard intervals via a channel. For example, the transmitter 930 may transmit the time-domain waveform, which may carry the information in frequency-division multiplexed (FDM) resources.

At block 910, the receiver 940 may receive the time-domain waveform and remove the guard interval from each of the symbols in the time-domain waveform.

At block 912, the receiver 940 may perform OFDM demodulation, for example, using a FFT to transform the time-domain waveform into frequency-domain symbols.

At block 914, the receiver 940 may perform symbol demapping for the information. For example, the receiver 940 may identify the set of time and frequency resources associated with the information in an OFDM resource grid.

At block 916, the receiver 940 may convert the OFDM symbols to the delay-Doppler domain. The receiver 940 may perform a two-dimensional IDFT, for example, in connection with the two-dimensional twisted convolution described herein with respect to FIG. 6.

At block 918, the receiver 940 may perform equalization and decoding on the symbols in the delay-Doppler domain. In certain aspects, the receiver 940 may process the symbols using the guard interval. For example, the receiver 940 may identify variations in the channel due to Doppler effects based on the received guard interval, which is encoded in the delay-Doppler domain. In the delay-Doppler domain, the receiver 940 may perform channel estimation using phase shifts to compensate for ICI, for example. The receiver 940 may equalize the samples using a two-dimensional deconvolution for example, in connection with the two-dimensional twisted convolution described herein with respect to FIG. 6. In some aspects, the receiver 940 may use the channel variations identified using the guard interval to perform the channel equalization. The delay-Doppler processing may be performed on blocks of symbols, such as L symbols of the information, as depicted in FIG. 7. The channel equalization in the delay-Doppler domain may facilitate improved wireless performance for high mobility devices or mmWave communications, for example, due to the improved channel estimation/compensation of Doppler spreading or delay spread.

Figure 10:
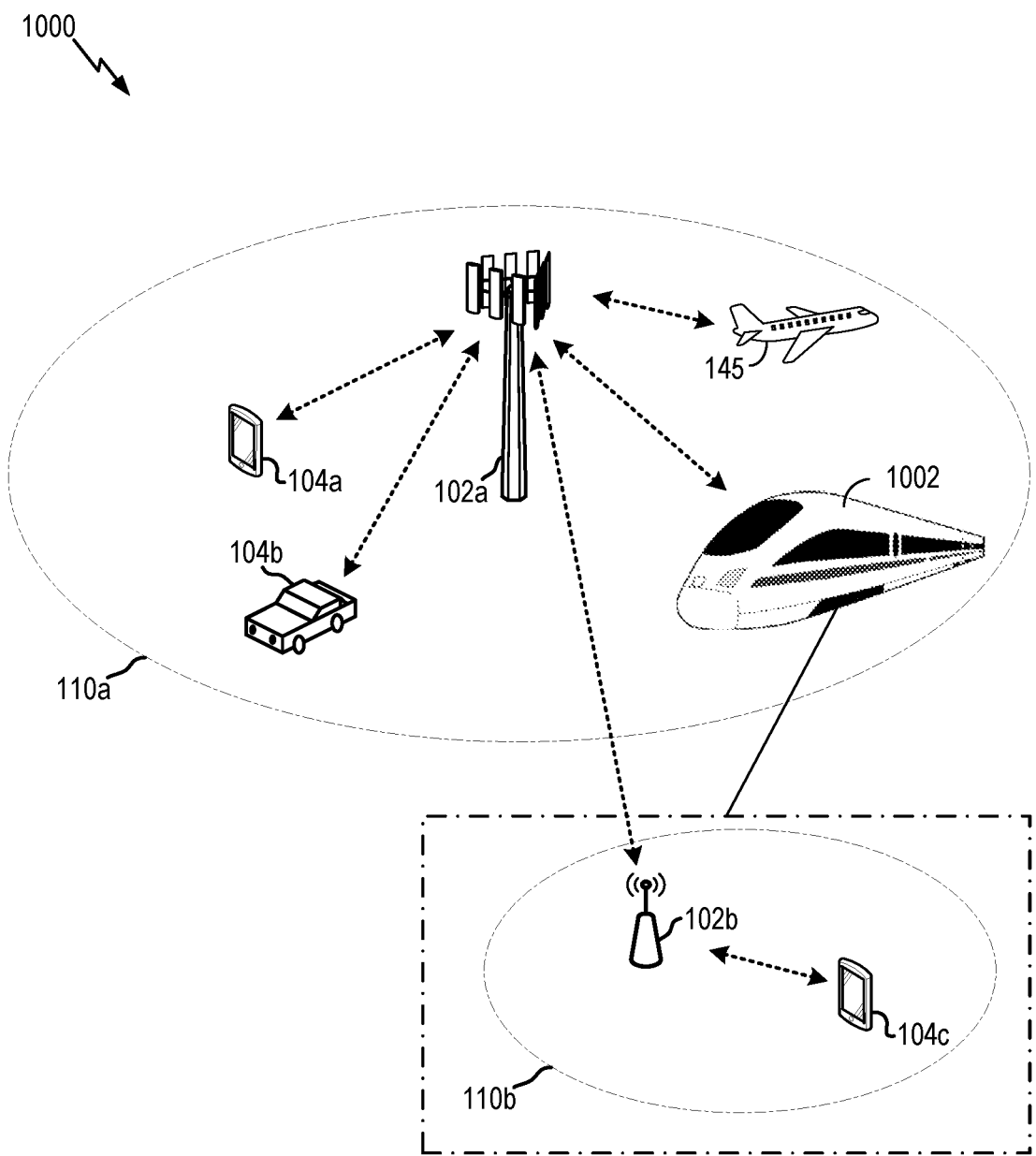
FIG. 10 is a diagram illustrating an example wireless communication network with different mobilities associated with wireless devices.

FIG. 10 is a diagram illustrating an example wireless communication network 1000 with different mobilities associated with wireless devices. In this example, a first BS 102a may have a first coverage area 110a, which may provide wireless coverage to a first UE 104a and a second UE 104b. The first UE 104a may be a low mobility or static wireless device, whereas the second UE 104b may be a high mobility wireless device. For example, the second UE 104b may be integrated with an automobile or a separate wireless device inside the automobile. It will be appreciated that the automobile is an example, and other types of vehicles may provide high mobility to a wireless device.

In certain cases, a train 1002 (e.g., a HST) and/or other high speed vehicles (e.g., an aircraft 145) may be in the first coverage area 110a of the first BS 102a. A second BS 102b may be located in (or integrated with, or deployed on) the train 1002 and in communication with the first BS 102a, such that the second BS 102b provides a second coverage area 110b for other UEs (e.g., a third UE 104c) in the train 1002 through a wireless backhaul with the first BS 102a. The second BS 102b may be another example of a high mobility wireless device in the first coverage area 110a.

As an example, the second BS 102*b* may be a customer-premises equipment (CPE) deployed on a HST or another high speed vehicle to provide localized wireless coverage to passengers, for example, using a 5G NR link as the backhaul. The CPE may be a TRP deployed on a high mobility vehicle such as a HST or automobile, where the TRP has a wireless communication link with a base station for the backhaul. The CPE may operate at high data rates (e.g., high modulation and coding schemes) to facilitate desirable performance for the delay-Doppler processing.

In some cases, the aircraft 145 may be an unmanned aerial vehicle (UAV) in communication with a radio access network, such as the first BS 102*a*. The aircraft 145 may provide additional wireless coverage (not shown) to other UEs, for example, using a wireless communication link as a backhaul link.

The delay-Doppler processing using a guard interval described herein may allow the devices experiencing Doppler effects (e.g., Doppler frequency shifts and/or Doppler spreading) to improve wireless communications, for example, by cancelling or mitigating ICI in the delay-Doppler domain due to the Doppler frequency shift and/or spreading. As an example, the first BS 102*a* may insert a guard interval in the delay-Doppler domain for transmitted signals, for example, as described herein with respect to FIGS. 7 and 8, and the second UE 104*b*, the second BS 102*b*, and/or the aircraft 145 may perform the delay-Doppler processing on downlink (or backhaul) channels for signals received from the first BS 102*a*. Similarly, the second UE 104*b*, the second BS 102*b*, and/or the aircraft 145 may insert a guard interval in the delay-Doppler domain on uplink (or backhaul) channels for transmitted signals, and the first BS 102*a* may perform the delay-Doppler processing on the received signals. The receiver may use the guard interval to determine variations in the channel due to Doppler effects and cancel or mitigate ICI in the delay-Doppler domain.

It will be appreciated that the delay-Doppler processing described herein may be used in other applications, such as for mmWave communications where the Doppler shift and/or delay spread can also impact wireless communication performance.

In certain aspects, various signaling may be used for configuring the guard interval in the delay-Doppler domain as described herein. The UE may indicate to the radio access network whether the UE has the capability to transmit and/or receive a signal with the guard interval in the delay-Doppler domain. The UE may indicate which type of guard interval is supported, for example, whether redundant symbol generation or reception is supported. The radio access network may communicate with the UE in response to the UE capability information. For certain aspects, the radio access network may configure the guard interval being transmitted or received at the UE. For example, the radio access network may configure the size of the guard interval (e.g., number of resource elements) in the delay-Doppler domain, the size of the redundant symbols portion, and/or the size of the known sequence portion. The radio access network may indicate whether the redundant symbols portion can overlap (e.g., non-overlapping, partially overlapping, or fully overlapping) with the known sequence portion of the guard interval. In certain aspects, the size of the guard interval may vary dynamically from one symbol to another or a group of symbols in response to certain criteria, such as different delay spread, Doppler spreading, beam switching, transmit-receive switching, etc. The radio access network may indicate, to the UE, to use GI-based OTFS dynamically, for example, via dynamic scheduling, periodic scheduling, and/or semi-persistent scheduling. The radio access network may indicate, to the UE, to use GI-based OTFS via DCI, RRC signaling, MAC signaling, and/or system information. In the case of switching from cyclic prefix-based OTFS to GI-based OTFS, the radio access network may signal, to the UE, regarding the change through control signaling, DCI or RRC signaling.

Figure 11:
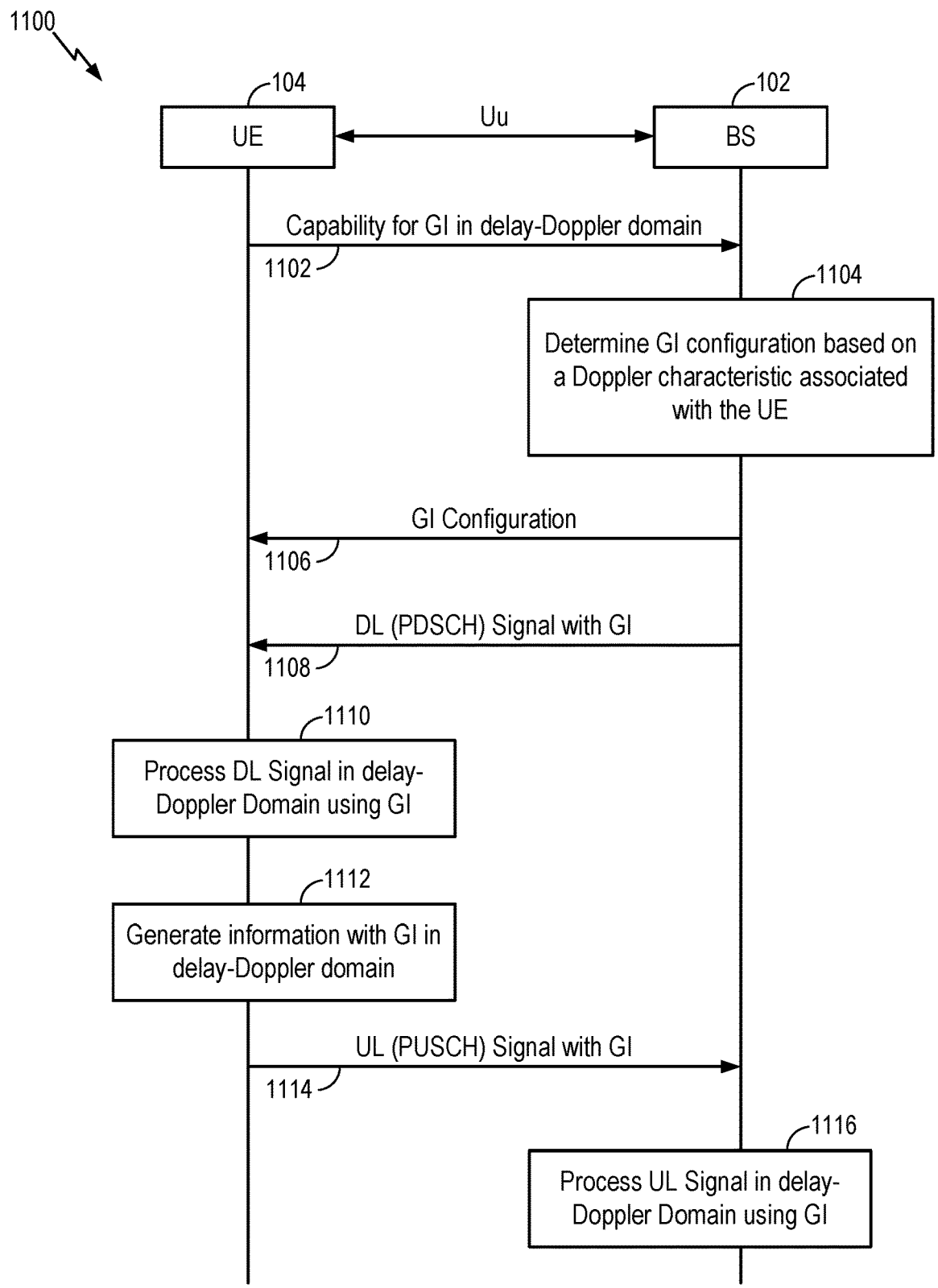
FIG. 11 depicts a process flow for communications in a network between a base station and a user equipment.

FIG. 11 depicts a process flow 1100 for communications in a network between a BS 102 and a UE 104. In some aspects, the BS 102 may be an example of the base stations depicted and described with respect to FIG. 1 and FIG. 3 or a disaggregated base station depicted and described with respect to FIG. 2. Similarly, the UE 104 may be an example of user equipment depicted and described with respect to FIGS. 1 and 3. However, in other aspects, the UE 104 may be another type of wireless communications device, and BS 102 may be another type of network entity or network node, such as those described herein.

At activity 1102, the UE 104 may transmit an indication of its capability to transmit and/or receive a signal with a guard interval in the delay-Doppler domain. The indication may indicate that the UE is capable of generating redundant symbols in the guard interval.

At activity 1104, the BS 102 may determine the guard interval configuration based on a Doppler characteristic associated with the UE 104. The BS 102 may determine a guard interval as described herein with respect to FIGS. 7 and 8 in response to detecting a Doppler characteristic associated with the UE 104 that satisfies a threshold (e.g., a Doppler shift or Doppler spread that exceeds a certain threshold). The BS 102 may detect that signals received from the UE 104 are exhibiting a certain Doppler shift, and in response to such a detection, the BS 102 may select a size of the guard interval in the delay-Doppler domain. For example, the BS 102 may select the size of the redundant symbols in the delay-Doppler domain based on the Doppler spread. In some aspects, the BS 102 may determine the guard interval configuration in response to receiving the UE's capability to transmit and/or receive a signal with a guard interval in the delay-Doppler domain at activity 1102.

At activity 1106, the UE 104 may receive an indication of a guard interval configuration. For example, the UE 104 may receive the guard interval configuration via DCI, RRC signaling, MAC signaling, and/or system information. In certain aspects, the guard interval configuration may be associated with dynamic scheduling, periodic scheduling, or semi-persistent scheduling. The guard interval configuration may indicate the size of the guard interval, the size of a redundant symbol portion, and/or the size of the known sequence portion in the delay-Doppler domain. In certain aspects, the guard interval configuration may indicate the type of sequence to use for the guard interval, such as zeroes, a Zadoff-Chu sequence, a PN sequence, redundant symbols, or a combination thereof.

At activity 1108, the UE 104 may receive a downlink signal with a guard interval formed in the delay-Doppler domain from the BS 102, for example, in the PDSCH. The guard interval may be formed in the delay-Doppler domain to mitigate inter-symbol interference due to Doppler effects, such as a Doppler or delay spreading.

At activity 1110, the UE 104 may process the received signal in the delay-Doppler domain, for example, as described herein with respect to FIG. 7. For example, the UE 104 may convert the OFDM symbols associated with the received signal to the delay-Doppler domain, and the UE 104 may perform channel equalization in the delay-Doppler domain, such as Doppler ICI compensation or cancellation.

The delay-Doppler processing may enable the UE 104 to cancel or mitigate the ICI due to Doppler shift or spreading.

At activity 1112, the UE 104 may generate information with a guard interval in the delay-Doppler domain, for example, as described herein with respect to FIG. 7 or FIG. 8. As an example, the UE 104 may generate information with a guard interval having a sequence of redundant symbols as described herein with respect to FIG. 7.

At activity 1114, the UE 104 may transmit an uplink signal with the guard interval formed in the delay-Doppler domain to the BS 102, for example, in the PUSCH.

At activity 1116, the BS 102 may process the uplink signal in the delay-Doppler domain, for example, as described herein with respect to FIG. 9. For example, the BS 102 may convert the OFDM symbols associated with the received signal to the delay-Doppler domain, and the BS 102 may perform channel equalization in the delay-Doppler domain, such as Doppler ICI compensation or cancellation. The delay-Doppler processing may enable the BS 102 to cancel or mitigate the ICI due to Doppler shift or spreading.

Example Operations of a Wireless Node

Figure 12:
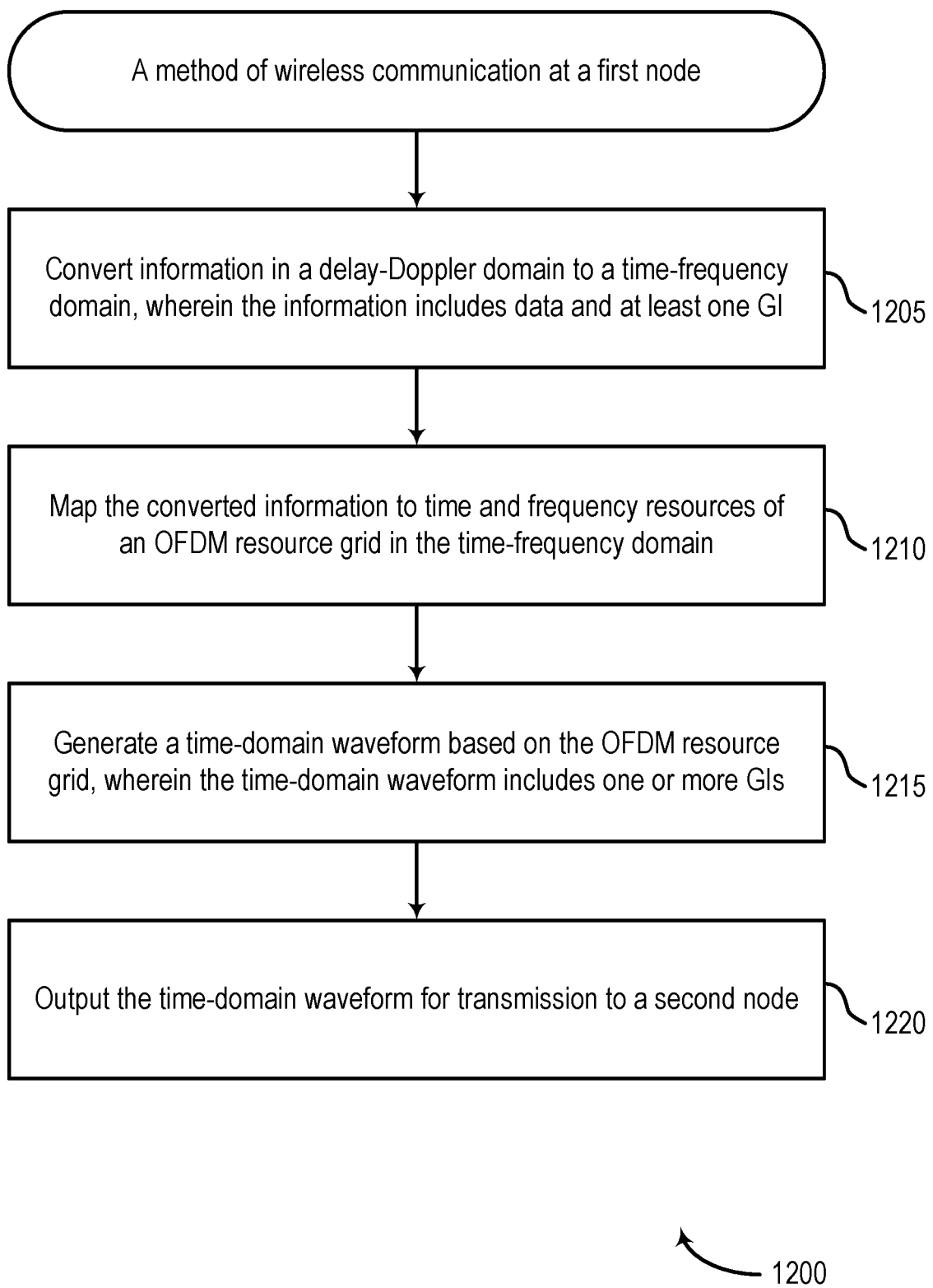
FIG. 12 depicts a method for wireless communications.

FIG. 12 shows an example of a method 1200 of wireless communication at a first node. In some aspects, the first node is a user equipment, such as UE 104 of FIGS. 1 and 3. In certain aspects, the first node is a base station, such as the BS 102 of FIGS. 1 and 3. The first node may be representative of a wireless communications device, such as the UE 104 or BS 102.

Method 1200 may optionally begin at step 1205, where the first node may convert information (e.g., the information 502) in a delay-Doppler domain to a time-frequency domain. The information includes data (e.g., the data 712) and at least one guard interval (e.g., the first guard interval 714a and/or the second guard interval 714b). In some cases, the operations of this step refer to, or may be performed by, circuitry for converting and/or code for converting as described with reference to FIG. 14.

Method 1200 then proceeds to step 1210, where the first node maps the converted information to time and frequency resources of an OFDM resource grid (e.g., the resource grid depicted in FIGS. 4A, 4B, 4C, and 4D) in the time-frequency domain. In some cases, the operations of this step refer to, or may be performed by, circuitry for mapping and/or code for mapping as described with reference to FIG. 14.

Method 1200 then proceeds to step 1215, where the first node may generate a time-domain waveform based on the OFDM resource grid. The time-domain waveform includes one or more GIs (e.g., the third guard interval 714c). In some cases, the operations of this step refer to, or may be performed by, circuitry for generating and/or code for generating as described with reference to FIG. 14.

Method 1200 then proceeds to step 1220, where the first node may output the time-domain waveform for transmission to a second node (e.g., the UE 104 or the BS 102). In some cases, the operations of this step refer to, or may be performed by, circuitry for outputting and/or code for outputting as described with reference to FIG. 14.

In some aspects, the method 1200 further includes generating the information with the at least one GI in the delay-Doppler domain, the at least one GI including a sequence in at least one of a head portion (e.g., the head 718) or a tail portion (e.g., the tail 716) of a delay domain. In some cases, the operations of this step refer to, or may be performed by, circuitry for generating and/or code for generating as described with reference to FIG. 14. In some aspects, the sequence comprises zeroes. In some aspects, the sequence comprises a Zadoff-Chu sequence or a PN sequence. In some aspects, the sequence comprises at least some non-zero symbols that are based on at least one of the data or a known signal, for example, as described herein with respect to Expressions (2)-(5). The known signal may include a Zadoff-Chu sequence or a PN sequence, for example. In some aspects, the sequence comprises: zeroes; a Zadoff-Chu sequence; a PN sequence; non-zero symbols, based on the data (for example, according to Expressions (2)-(4)); non-zero symbols, based on the data and a known signal (for example, according to Expression (5)); or a combination thereof. In some aspects, the at least one GI includes a first portion (e.g., the first portion 822a) and a second portion (e.g., the second portion 822b) arranged in a delay domain; the first portion includes a first sequence based on the data; and the second portion includes a second sequence based on a known signal, the sequence including the first sequence and the second sequence.

In some aspects, a size of the at least one GI is based on at least one Doppler characteristic, for example, as described herein with respect to Expression (1). In some aspects, the Doppler characteristic comprises a delay spread or a Doppler spread. In some aspects, the size of the at least one GI is further based on an up-sampling ratio.

In some aspects, the method 1200 further includes obtaining signaling indicating at least one of: one or more resource elements (REs) allocated in the delay-Doppler domain for the at least one GI; one or more REs allocated in the delay-Doppler domain for a known signal in the at least one GI; one or more REs allocated in the delay-Doppler domain for redundant symbols in the at least one GI; whether the one or more REs for the redundant symbols overlap with the known signal; or a change in GI length (e.g., a number of REs allocated in the delay-Doppler domain). In some cases, the operations of this step refer to, or may be performed by, circuitry for obtaining and/or code for obtaining as described with reference to FIG. 14.

In some aspects, the method 1200 further includes outputting for transmission signaling indicating a capability of the first node to support outputting of the time-domain waveform including the one or more GIs for transmission. In some cases, the operations of this step refer to, or may be performed by, circuitry for outputting and/or code for outputting as described with reference to FIG. 14.

In some aspects, the method 1200 further includes outputting for transmission signaling indicating, to the second node, at least one of: one or more REs allocated in the delay-Doppler domain for the at least one GI; one or more REs allocated in the delay-Doppler domain for a known signal in the at least one GI; one or more REs allocated in the delay-Doppler domain for redundant symbols; whether the one or more REs for the redundant symbols overlap with the known signal; or a change in GI length. In some cases, the operations of this step refer to, or may be performed by, circuitry for outputting and/or code for outputting as described with reference to FIG. 14.

In some aspects, the method 1200 further includes obtaining signaling indicating a capability of the second node to support reception of the time-domain waveform including the one or more GIs. In some cases, the operations of this step refer to, or may be performed by, circuitry for obtaining and/or code for obtaining as described with reference to FIG. 14.

Figure 14:
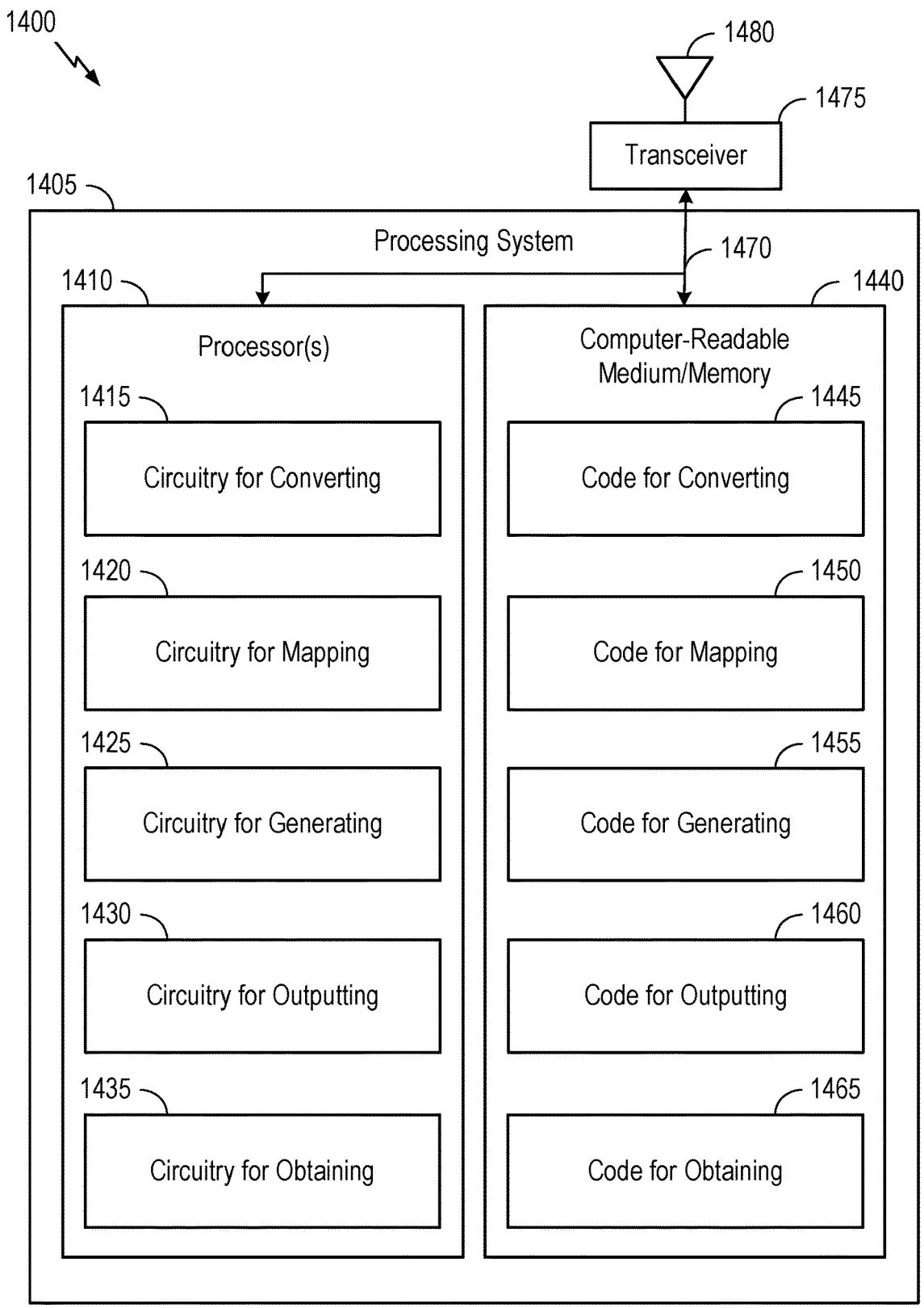
FIG. 14 depicts aspects of an example communications device.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

Figure 13:
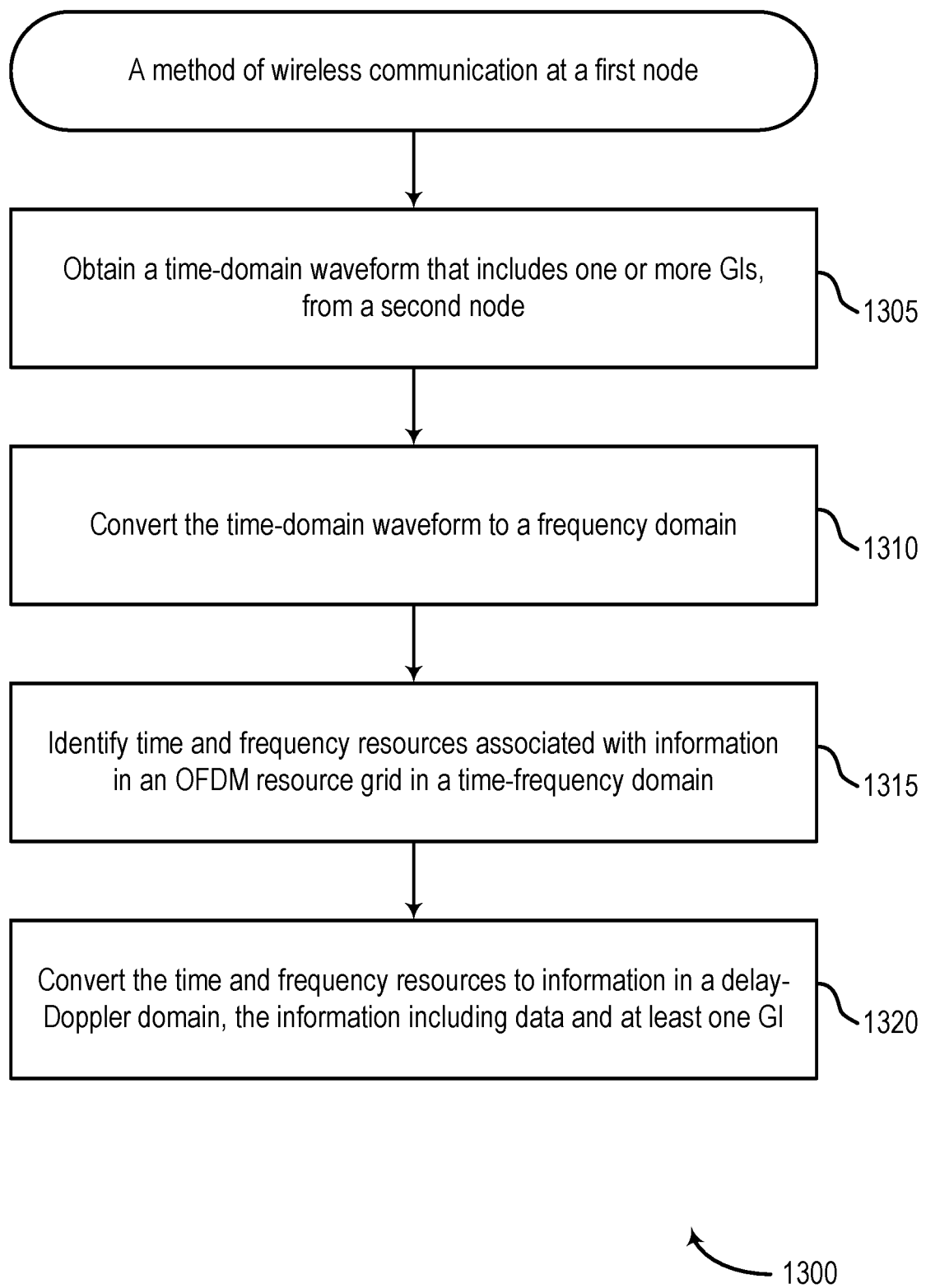
FIG. 13 depicts a method for wireless communications.

FIG. 13 shows an example of a method 1300 of wireless communication at a first node. In some aspects, the first node is a user equipment, such as UE 104 of FIGS. 1 and 3. In certain aspects, the first node is a base station, such as the BS 102 of FIGS. 1 and 3. The first node may be representative of a wireless communications device, such as the UE 104 or BS 102.

Method 1300 may optionally begin at step 1305, where the first node may obtaining a time-domain waveform that includes one or more GIs (e.g., the third guard interval 714c), from a second node (e.g., the UE 104 or the BS 102). In some cases, the operations of this step refer to, or may be performed by, circuitry for obtaining and/or code for obtaining as described with reference to FIG. 15.

Method 1300 then proceeds to step 1310, where the first node may convert the time-domain waveform to a frequency domain. In some cases, the operations of this step refer to, or may be performed by, circuitry for converting and/or code for converting as described with reference to FIG. 15.

Method 1300 then proceeds to step 1315, where the first node may identify time and frequency resources associated with information in an OFDM resource grid in a time-frequency domain. In some cases, the operations of this step refer to, or may be performed by, circuitry for identifying and/or code for identifying as described with reference to FIG. 15.

Method 1300 then proceeds to step 1320, where the first node may convert the time and frequency resources to information in a delay-Doppler domain, the information including data and at least one GI. In some cases, the operations of this step refer to, or may be performed by, circuitry for converting and/or code for converting as described with reference to FIG. 15.

In some aspects, the method 1300 further includes determining channel variations using the at least one GI in the delay-Doppler domain. In some cases, the operations of this step refer to, or may be performed by, circuitry for determining and/or code for determining as described with reference to FIG. 15.

In some aspects, the at least one GI includes a sequence in at least one of a head portion or a tail portion of a delay domain. In some aspects, the sequence comprises zeroes. In some aspects, the sequence comprises a Zadoff-Chu sequence or a PN sequence. In some aspects, the sequence comprises at least some non-zero symbols that are based on at least one of the data or a known signal. In some aspects, the sequence comprises: zeroes; a Zadoff-Chu sequence; a PN sequence; non-zero symbols, based on the data; non-zero symbols, based on the data and a known signal; or a combination thereof. In some aspects, the at least one GI includes a first portion and a second portion arranged in a delay domain; the first portion includes a first sequence based on the data; and the second portion includes a second sequence based on a known signal, the sequence including the first sequence and the second sequence.

In some aspects, a size of the at least one GI is based on at least one Doppler characteristic. In some aspects, the Doppler characteristic comprises a delay spread. In some aspects, the size of the at least one GI is further based on an up-sampling ratio.

In some aspects, the method 1300 further includes obtaining signaling indicating at least one of: one or more REs allocated in the delay-Doppler domain for the at least one GI; one or more REs allocated in the delay-Doppler domain for a known signal in the at least one GI; one or more REs allocated in the delay-Doppler domain for redundant symbols in the at least one GI; whether the one or more REs for the redundant symbols overlap with the known signal; or a change in GI length. In some cases, the operations of this step refer to, or may be performed by, circuitry for obtaining and/or code for obtaining as described with reference to FIG. 15.

In some aspects, the method 1300 further includes outputting for transmission signaling indicating a capability of the first node to support reception of the time-domain waveform including the one or more GIs. In some cases, the operations of this step refer to, or may be performed by, circuitry for outputting and/or code for outputting as described with reference to FIG. 15.

In some aspects, the method 1300 further includes outputting for transmission signaling indicating, to the second node, at least one of: one or more REs allocated in the delay-Doppler domain for the at least one GI; one or more REs allocated in the delay-Doppler domain for a known signal in the at least one GI; one or more REs allocated in the delay-Doppler domain for redundant symbols; whether the one or more REs for the redundant symbols overlap with the known signal; or a change in GI length. In some cases, the operations of this step refer to, or may be performed by, circuitry for outputting and/or code for outputting as described with reference to FIG. 15.

In some aspects, the method 1300 further includes obtaining signaling indicating a capability of the second node to support outputting of the time-domain waveform including the one or more GIs for transmission. In some cases, the operations of this step refer to, or may be performed by, circuitry for obtaining and/or code for obtaining as described with reference to FIG. 15.

Figure 15:
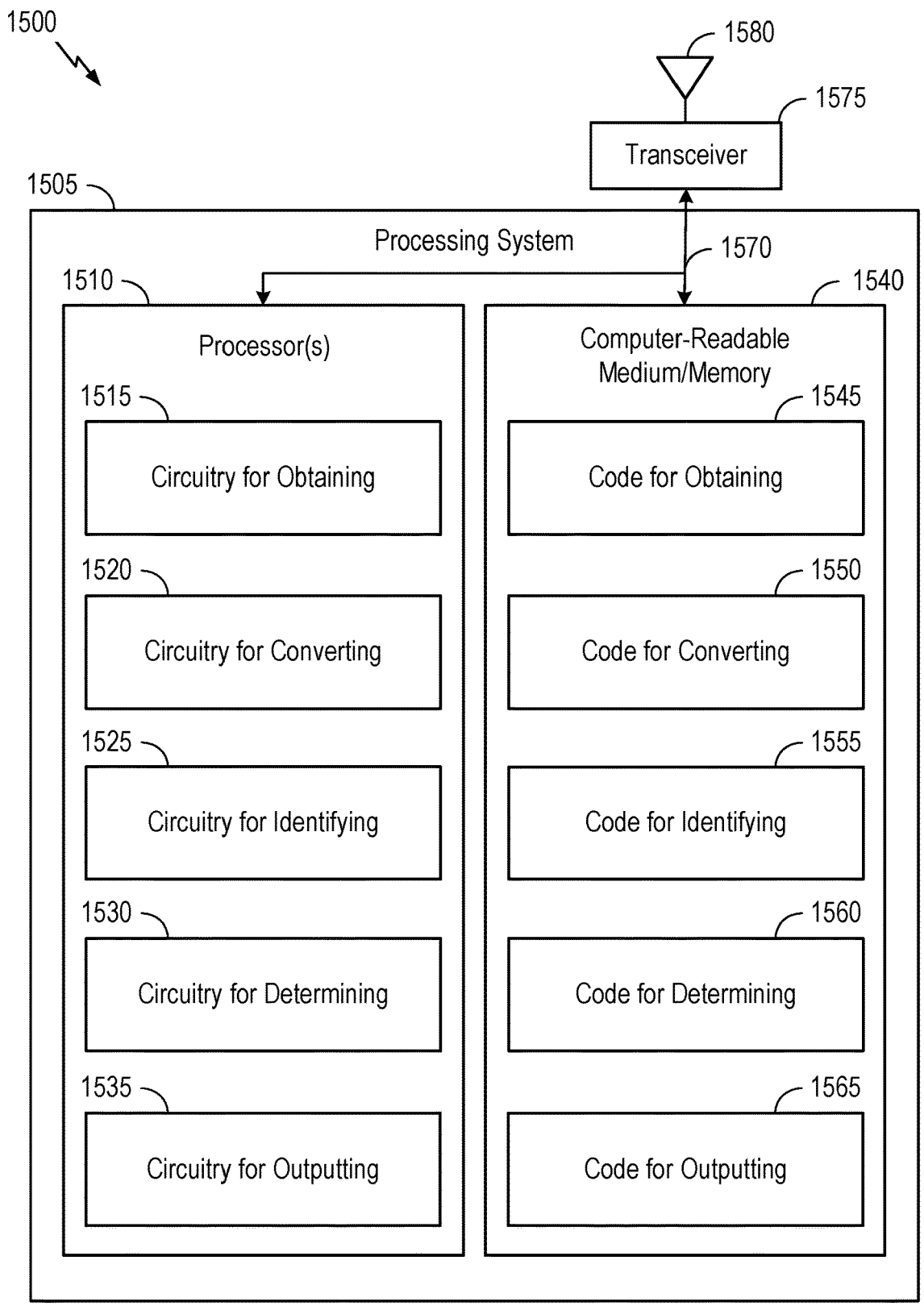
FIG. 15 depicts aspects of an example communications device.

In one aspect, method 1300, or any aspect related to it, may be performed by an apparatus, such as communications device 1500 of FIG. 15, which includes various components operable, configured, or adapted to perform the method 1300. Communications device 1500 is described below in further detail.

Note that FIG. 13 is just one example of a method, and other methods including fewer, additional, or alternative steps are possible consistent with this disclosure.

Example Communications Devices

FIG. 14 depicts aspects of an example (wireless) communications device 1400. In some aspects, communications device 1400 is a user equipment, such as UE 104 described above with respect to FIGS. 1 and 3. In certain aspects, communications device 1400 is a base station, such as BS 102 described above with respect to FIGS. 1 and 3. In some aspects, the communications device 1400 may be representative of a wireless node, such as the first node described with respect to FIG. 12.

The communications device 1400 includes a processing system 1405 coupled to the transceiver 1475 (e.g., a transmitter and/or a receiver). The transceiver 1475 is configured to transmit and receive signals for the communications device 1400 via the antenna 1480, such as the various signals as described herein. The processing system 1405 may be configured to perform processing functions for the communications device 1400, including processing signals received and/or to be transmitted by the communications device 1400.

The processing system 1405 includes one or more processors 1410. In various aspects, the one or more processors 1410 may be representative of one or more of receive processor 358, transmit processor 364, TX MIMO processor 366, and/or controller/processor 380, as described with respect to FIG. 3. In some aspects, the one or more processors 1510 may be representative of one or more of receive processor 338, transmit processor 320, TX MIMO processor 330, and/or controller/processor 340, as described with respect to FIG. 3. The one or more processors 1410 are coupled to a computer-readable medium/memory 1440 via a bus 1470. In certain aspects, the computer-readable medium/memory 1440 is configured to store instructions (e.g., computer-executable code or processor-executable instructions) that when executed by the one or more processors 1410, cause the one or more processors 1410 to perform the method 1200 described with respect to FIG. 12, or any aspect related to it. Note that reference to a processor performing a function of communications device 1400 may include one or more processors 1410 performing that function of communications device 1400.

In the depicted example, computer-readable medium/memory 1440 stores code (e.g., executable instructions), such as code for converting 1445, code for mapping 1450, code for generating 1455, code for outputting 1460, and code for obtaining 1465. Processing of the code for converting 1445, code for mapping 1450, code for generating 1455, code for outputting 1460, and code for obtaining 1465 may cause the communications device 1400 to perform the method 1200 described with respect to FIG. 12, or any aspect related to it.

The one or more processors 1410 include circuitry configured to implement (e.g., execute) the code stored in the computer-readable medium/memory 1440, including circuitry such as circuitry for converting 1415, circuitry for mapping 1420, circuitry for generating 1425, circuitry for outputting 1430, and circuitry for obtaining 1435. Processing with circuitry for converting 1415, circuitry for mapping 1420, circuitry for generating 1425, circuitry for outputting 1430, and circuitry for obtaining 1435 may cause the communications device 1400 to perform the method 1200 described with respect to FIG. 12, or any aspect related to it.

Various components of the communications device 1400 may provide means for performing the method 1200 described with respect to FIG. 12, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1475 and the antenna 1480 of the communications device 1400 in FIG. 14. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1475 and the antenna 1480 of the communications device 1400 in FIG. 14. In some examples, means for converting, means for mapping, and/or means for generating may include various processing system components, such as: the one or more processors 1410 in FIG. 14; aspects of the BS 102 depicted in FIG. 3, including receive processor 338, transmit processor 320, TX MIMO processor 330, and/or controller/processor 340; or aspects of the UE 104 depicted in FIG. 3, including receive processor 358, transmit processor 364, TX MIMO processor 366, and/or controller/processor 380.

FIG. 15 depicts aspects of an example (wireless) communications device 1500. In some aspects, communications device 1500 is a user equipment, such as UE 104 described above with respect to FIGS. 1 and 3. In some aspects, communications device 1500 is a base station, such as BS 102 described above with respect to FIGS. 1 and 3. In some aspects, the communications device 1500 may be representative of a wireless node, such as the first node described with respect to FIG. 13.

The communications device 1500 includes a processing system 1505 coupled to the transceiver 1575 (e.g., a transmitter and/or a receiver). The transceiver 1575 is configured to transmit and receive signals for the communications device 1500 via the antenna 1580, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of receive processor 358, transmit processor 364, TX MIMO processor 366, and/or controller/processor 380, as described with respect to FIG. 3. In some aspects, the one or more processors 1510 may be representative of one or more of receive processor 338, transmit processor 320, TX MIMO processor 330, and/or controller/processor 340, as described with respect to FIG. 3. The one or more processors 1510 are coupled to a computer-readable medium/memory 1540 via a bus 1570. In certain aspects, the computer-readable medium/memory 1540 is configured to store instructions (e.g., computer-executable code) that when executed by the one or more processors 1510, cause the one or more processors 1510 to perform the method 1300 described with respect to FIG. 13, or any aspect related to it. Note that reference to a processor performing a function of communications device 1500 may include one or more processors 1510 performing that function of communications device 1500.

In the depicted example, computer-readable medium/memory 1540 stores code (e.g., executable instructions or processor-executable instructions), such as code for obtaining 1545, code for converting 1550, code for identifying 1555, code for determining 1560, and code for outputting 1565. Processing of the code for obtaining 1545, code for converting 1550, code for identifying 1555, code for determining 1560, and code for outputting 1565 may cause the communications device 1500 to perform the method 1300 described with respect to FIG. 13, or any aspect related to it.

The one or more processors 1510 include circuitry configured to implement (e.g., execute) the code stored in the computer-readable medium/memory 1540, including circuitry such as circuitry for obtaining 1515, circuitry for converting 1520, circuitry for identifying 1525, circuitry for determining 1530, and circuitry for outputting 1535. Processing with circuitry for obtaining 1515, circuitry for converting 1520, circuitry for identifying 1525, circuitry for determining 1530, and circuitry for outputting 1535 may cause the communications device 1500 to perform the method 1300 described with respect to FIG. 13, or any aspect related to it.

Various components of the communications device 1500 may provide means for performing the method 1300 described with respect to FIG. 13, or any aspect related to it.

For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1575 and the antenna 1580 of the communications device 1500 in FIG. 15. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1575 and the antenna 1580 of the communications device 1500 in FIG. 15. In some examples, means for converting, means for identifying, and/or means for determining may include various processing system components, such as: the one or more processors 1510 in FIG. 15; aspects of the BS 102 depicted in FIG. 3, including receive processor 338, transmit processor 320, TX MIMO processor 330, and/or controller/processor 340; or aspects of the UE 104 depicted in FIG. 3, including receive processor 358, transmit processor 364, TX MIMO processor 366, and/or controller/processor 380.

EXAMPLE CLAUSES

Implementation examples are described in the following numbered clauses:

Clause 1: A method of wireless communication at a first node, comprising: converting information in a delay-Doppler domain to a time-frequency domain, wherein the information includes data and at least one GI; mapping the converted information to time and frequency resources of an OFDM resource grid in the time-frequency domain; generating a time-domain waveform based on the OFDM resource grid, wherein the time-domain waveform includes one or more GIs; and outputting the time-domain waveform for transmission to a second node.

Clause 2: The method of Clause 1, further comprising: generating the information with the at least one GI in the delay-Doppler domain, the at least one GI including a sequence in at least one of a head portion or a tail portion of a delay domain.

Clause 3: The method of Clause 2, wherein the sequence comprises zeroes.

Clause 4: The method of Clause 2 or 3, wherein the sequence comprises a Zadoff-Chu sequence or a PN sequence.

Clause 5: The method any one of Clauses 2-4, wherein the sequence comprises at least some non-zero symbols that are based on at least one of the data or a known signal.

Clause 6: The method of Clause 2, wherein the sequence comprises: zeroes; a Zadoff-Chu sequence; a PN sequence; non-zero symbols, based on the data; non-zero symbols, based on the data and a known signal; or a combination thereof.

Clause 7: The method of Clause 2, wherein: the at least one GI includes a first portion and a second portion arranged in a delay domain; the first portion includes a first sequence based on the data; and the second portion includes a second sequence based on a known signal, the sequence including the first sequence and the second sequence.

Clause 8: The method of any one of Clauses 1-7, wherein a size of the at least one GI is based on at least one Doppler characteristic.

Clause 9: The method of Clause 8, wherein the Doppler characteristic comprises a delay spread.

Clause 10: The method of Clause 8 or 9, wherein the size of the at least one GI is further based on an up-sampling ratio.

Clause 11: The method of any one of Clauses 1-10, further comprising: obtaining signaling indicating at least one of: one or more REs allocated in the delay-Doppler domain for the at least one GI; one or more REs allocated in the delay-Doppler domain for a known signal in the at least one GI; one or more REs allocated in the delay-Doppler domain for redundant symbols in the at least one GI; whether the one or more REs for the redundant symbols overlap with the known signal; or a change in GI length.

Clause 12: The method of any one of Clauses 1-11, further comprising: outputting for transmission signaling indicating a capability of the first node to support outputting of the time-domain waveform including the one or more GIs for transmission.

Clause 13: The method of any one of Clauses 1-12, further comprising: outputting for transmission signaling indicating, to the second node, at least one of: one or more REs allocated in the delay-Doppler domain for the at least one GI; one or more REs allocated in the delay-Doppler domain for a known signal in the at least one GI; one or more REs allocated in the delay-Doppler domain for redundant symbols; whether the one or more REs for the redundant symbols overlap with the known signal; or a change in GI length.

Clause 14: The method of any one of Clauses 1-13, further comprising: obtaining signaling indicating a capability of the second node to support reception of the time-domain waveform including the one or more GIs.

Clause 15: A method of wireless communication at a first node, comprising: obtaining a time-domain waveform that includes one or more GIs, from a second node; converting the time-domain waveform to a frequency domain; identifying time and frequency resources associated with information in an OFDM resource grid in a time-frequency domain; and converting the time and frequency resources to information in a delay-Doppler domain, the information including data and at least one GI.

Clause 16: The method of Clause 15, further comprising: determining channel variations using the at least one GI in the delay-Doppler domain.

Clause 17: The method of any one of Clauses 15 and 16, wherein the at least one GI includes a sequence in at least one of a head portion or a tail portion of a delay domain.

Clause 18: The method of Clause 17, wherein the sequence comprises zeroes.

Clause 19: The method of Clause 17 or 18, wherein the sequence comprises a Zadoff-Chu sequence or a PN sequence.

Clause 20: The method any one of Clauses 17-19, wherein the sequence comprises at least some non-zero symbols that are based on at least one of the data or a known signal.

Clause 21: The method of Clause 17, wherein the sequence comprises: zeroes; a Zadoff-Chu sequence; a PN sequence; non-zero symbols, based on the data; non-zero symbols, based on the data and a known signal; or a combination thereof.

Clause 22: The method of Clause 17, wherein: the at least one GI includes a first portion and a second portion arranged in a delay domain; the first portion includes a first sequence based on the data; and the second portion includes a second sequence based on a known signal, the sequence including the first sequence and the second sequence.

Clause 23: The method of any one of Clauses 15-22, wherein a size of the at least one GI is based on at least one Doppler characteristic.

Clause 24: The method of Clause 23, wherein the Doppler characteristic comprises a delay spread.

Clause 25: The method of Clause 23 or 24, wherein the size of the at least one GI is further based on an up-sampling ratio.

Clause 26: The method of any one of Clauses 15-25, further comprising: obtaining signaling indicating at least one of: one or more REs allocated in the delay-Doppler domain for the at least one GI; one or more REs allocated in the delay-Doppler domain for a known signal in the at least one GI; one or more REs allocated in the delay-Doppler domain for redundant symbols in the at least one GI; whether the one or more REs for the redundant symbols overlap with the known signal; or a change in GI length.

Clause 27: The method of any one of Clauses 15-26, further comprising: outputting for transmission signaling indicating a capability of the first node to support reception of the time-domain waveform including the one or more GIs.

Clause 28: The method of any one of Clauses 15-27, further comprising: outputting for transmission signaling indicating, to the second node, at least one of: one or more REs allocated in the delay-Doppler domain for the at least one GI; one or more REs allocated in the delay-Doppler domain for a known signal in the at least one GI; one or more REs allocated in the delay-Doppler domain for redundant symbols; whether the one or more REs for the redundant symbols overlap with the known signal; or a change in GI length.

Clause 29: The method of any one of Clauses 15-28, further comprising: obtaining signaling indicating a capability of the second node to support outputting of the time-domain waveform including the one or more GIs for transmission.

Clause 30: An apparatus, comprising: a memory comprising executable instructions; and a processor configured to execute the executable instructions and cause the apparatus to perform a method in accordance with any one of Clauses 1-29.

Clause 31: An apparatus, comprising means for performing a method in accordance with any one of Clauses 1-29.

Clause 32: A non-transitory computer-readable medium comprising executable instructions that, when executed by a processor of an apparatus, cause the apparatus to perform a method in accordance with any one of Clauses 1-29.

Clause 33: A computer program product embodied on a computer-readable storage medium comprising code for performing a method in accordance with any one of Clauses 1-29.

Clause 34: A user equipment, comprising: at least one transceiver; a memory comprising instructions; and a processor configured to execute the instructions and cause the user equipment to perform a method in accordance with any one of Clauses 1-12 and 15-27, wherein the at least one transceiver is configured to transmit or receive a time-domain waveform that includes at least one guard interval.

Clause 35: A network entity, comprising: at least one transceiver; a memory comprising instructions; and a processor configured to execute the instructions and cause the network entity to perform a method in accordance with any one of Clauses 1-10, 13, 14, 15-25, 28, and 29, wherein the at least one transceiver is configured to transmit or receive a time-domain waveform that includes at least one guard interval.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:
    a memory comprising processor-executable instructions; and
    a processor configured to execute the processor-executable instructions and cause the apparatus to:
        convert information in a delay-Doppler domain to a time-frequency domain, wherein the information includes data and at least one guard interval (GI),
        map the converted information to time and frequency resources of an orthogonal frequency domain multiplexing (OFDM) resource grid in the time-frequency domain,
        generate a time-domain waveform based on the OFDM resource grid, wherein the time-domain waveform includes one or more GIs, and
        output the time-domain waveform for transmission to a node.

2. The apparatus of claim 1, wherein the processor is further configured to execute the processor-executable instructions and cause the apparatus to generate the information with the at least one GI in the delay-Doppler domain, the at least one GI including a sequence in at least one of a head portion or a tail portion of a delay domain.

3. The apparatus of claim 2, wherein the sequence comprises zeroes.

4. The apparatus of claim 2, wherein the sequence comprises a Zadoff-Chu sequence or a pseudorandom noise (PN) sequence.

5. The apparatus of claim 2, wherein the sequence comprises at least some non-zero symbols that are based on at least one of the data or a known signal.

6. The apparatus of claim 2, wherein the sequence comprises:
    zeroes;
    a Zadoff-Chu sequence;
    a pseudorandom noise (PN) sequence;
    non-zero symbols, based on the data;
    non-zero symbols, based on the data and a known signal; or
    a combination thereof.

7. The apparatus of claim 2, wherein:
    the at least one GI includes a first portion and a second portion arranged in a delay domain;
    the first portion includes a first sequence based on the data; and
    the second portion includes a second sequence based on a known signal, the sequence including the first sequence and the second sequence.

8. The apparatus of claim 1, wherein a size of the at least one GI is based on at least one Doppler characteristic.

9. The apparatus of claim 8, wherein the Doppler characteristic comprises a delay spread.

10. The apparatus of claim 8, wherein the size of the at least one GI is further based on an up-sampling ratio.

11. The apparatus of claim 1, wherein the processor is further configured to execute the processor-executable instructions and cause the apparatus to obtain signaling indicating at least one of:
    one or more resource elements (REs) allocated in the delay-Doppler domain for the at least one GI;
    one or more REs allocated in the delay-Doppler domain for a known signal in the at least one GI;
    one or more REs allocated in the delay-Doppler domain for redundant symbols in the at least one GI;
    whether the one or more REs for the redundant symbols overlap with the known signal; or
    a change in GI length.

12. The apparatus of claim 1, wherein the processor is further configured to execute the processor-executable instructions and cause the apparatus to output for transmission signaling indicating a capability of the apparatus to support outputting of the time-domain waveform including the one or more GIs for transmission.

13. The apparatus of claim 1, wherein the processor is further configured to execute the processor-executable instructions and cause the apparatus to output for transmission signaling indicating, to the node, at least one of:
    one or more resource elements (REs) allocated in the delay-Doppler domain for the at least one GI;
    one or more REs allocated in the delay-Doppler domain for a known signal in the at least one GI;
    one or more REs allocated in the delay-Doppler domain for redundant symbols;
    whether the one or more REs for the redundant symbols overlap with the known signal; or
    a change in GI length.

14. The apparatus of claim 1, wherein the processor is further configured to execute the processor-executable instructions and cause the apparatus to obtain signaling indicating a capability of the node to support reception of the time-domain waveform including the one or more GIs.

15. An apparatus for wireless communication, comprising:
    a memory comprising processor-executable instructions; and
    a processor configured to execute the processor-executable instructions and cause the apparatus to:
        obtain a time-domain waveform that includes one or more guard intervals (GIs), from a node,
        convert the time-domain waveform to a frequency domain,
        identify time and frequency resources associated with information in an orthogonal frequency domain multiplexing (OFDM) resource grid in a time-frequency domain, and
        convert the time and frequency resources to information in a delay-Doppler domain, the information including data and at least one GI.

16. The apparatus of claim 15, wherein the processor is further configured to execute the processor-executable instructions and cause the apparatus to determine channel variations using the at least one GI in the delay-Doppler domain.

17. The apparatus of claim 15, further comprising a transceiver configured to receive the time-domain waveform, wherein the at least one GI includes a sequence in at least one of a head portion or a tail portion of a delay domain, and wherein the apparatus is configured as a user equipment or a network entity.

18. The apparatus of claim 17, wherein the sequence comprises zeroes.

19. The apparatus of claim 17, wherein the sequence comprises a Zadoff-Chu sequence or a pseudorandom noise (PN) sequence.

20. The apparatus of claim 17, wherein the sequence comprises at least some non-zero symbols that are based on at least one of the data or a known signal.

21. The apparatus of claim 17, wherein the sequence comprises:
zeroes;
a Zadoff-Chu sequence;
a pseudorandom noise (PN) sequence;
non-zero symbols, based on the data;
non-zero symbols, based on the data and a known signal; or
a combination thereof.

22. The apparatus of claim 17, wherein:
the at least one GI includes a first portion and a second portion arranged in a delay domain;
the first portion includes a first sequence based on the data; and
the second portion includes a second sequence based on a known signal, the sequence including the first sequence and the second sequence.

23. The apparatus of claim 15, wherein a size of the at least one GI is based on at least one Doppler characteristic.

24. The apparatus of claim 23, wherein the Doppler characteristic comprises a delay spread.

25. The apparatus of claim 23, wherein the size of the at least one GI is further based on an up-sampling ratio.

26. The apparatus of claim 15, wherein the processor is further configured to execute the processor-executable instructions and cause the apparatus to obtain signaling indicating at least one of:
one or more resource elements (REs) allocated in the delay-Doppler domain for the at least one GI;
one or more REs allocated in the delay-Doppler domain for a known signal in the at least one GI;
one or more REs allocated in the delay-Doppler domain for redundant symbols in the at least one GI;
whether the one or more REs for the redundant symbols overlap with the known signal; or
a change in GI length.

27. The apparatus of claim 15, wherein the processor is further configured to execute the processor-executable instructions and cause the apparatus to output for transmission signaling indicating a capability of the apparatus to support reception of the time-domain waveform including the one or more GIs.

28. The apparatus of claim 15, wherein the processor is further configured to execute the processor-executable instructions and cause the apparatus to output for transmission signaling indicating, to the node, at least one of:
one or more resource elements (REs) allocated in the delay-Doppler domain for the at least one GI;
one or more REs allocated in the delay-Doppler domain for a known signal in the at least one GI;
one or more REs allocated in the delay-Doppler domain for redundant symbols;
whether the one or more REs for the redundant symbols overlap with the known signal; or
a change in GI length.

29. The apparatus of claim 15, wherein the processor is further configured to execute the processor-executable instructions and cause the apparatus to obtain signaling indicating a capability of the node to support outputting of the time-domain waveform including the one or more GIs for transmission.

30. A wireless communications device, comprising:
a memory comprising processor-executable instructions;
a processor configured to execute the processor-executable instructions and cause the device to:
convert information in a delay-Doppler domain to a time-frequency domain, wherein the information includes data and at least one guard interval (GI),
map the converted information to time and frequency resources of an orthogonal frequency domain multiplexing (OFDM) resource grid in the time-frequency domain, and
generate a time-domain waveform based on the OFDM resource grid, wherein the time-domain waveform includes one or more GIs; and
a transceiver configured to transmit the time-domain waveform for transmission to a node.

* * * * *